(12) United States Patent
Islam et al.

(10) Patent No.: US 12,363,760 B2
(45) Date of Patent: *Jul. 15, 2025

(54) SEARCH SPACE CONFIGURATIONS FOR RANDOM ACCESS MESSAGING

(71) Applicant: QUALCOMM Incorporated, San Diego, CA (US)

(72) Inventors: Muhammad Nazmul Islam, Littleton, MA (US); Bilal Sadiq, Southlake, TX (US); Navid Abedini, Basking Ridge, NJ (US); Heechoon Lee, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,245

(22) Filed: Apr. 8, 2024

(65) Prior Publication Data

US 2024/0365390 A1  Oct. 31, 2024

Related U.S. Application Data

(63) Continuation of application No. 16/282,614, filed on Feb. 22, 2019, now Pat. No. 11,974,321.
(Continued)

(51) Int. Cl.
*H04W 74/0833* (2024.01)
*H04B 7/0413* (2017.01)
(Continued)

(52) U.S. Cl.
CPC ....... *H04W 74/0833* (2013.01); *H04L 5/0051* (2013.01); *H04L 27/2602* (2013.01);
(Continued)

(58) Field of Classification Search
CPC .............................. H04W 74/0833
See application file for complete search history.

(56) References Cited

U.S. PATENT DOCUMENTS 10,165,423 B2  12/2018  Rico Alvarino et al.
2016/0007326 A1  1/2016  Qu et al.
(Continued)

FOREIGN PATENT DOCUMENTS

CN  104868975 A  8/2015
CN  107534835 A  1/2018
(Continued)

OTHER PUBLICATIONS

3GPP TS 38.213: "3rd Generation Partnership Project; Technical Specification Group Radio Access Network; NR; Physical Layer Procedures for Control (Release 15)", 3GPP Standard; Technical Specification; 3rd Generation Partnership Project, Mobile Competence Centre; 650, Route Des Lucioles; F-06921 Sophia-Antipolis Cedex; France, vol. RAN WG1, No. V15.1.0, Apr. 8, 2018, pp. 1-77, XP051451088, section 1 "Scope" section 8 "Random Access Procedure", p. 60, paragraph 11.1.1, paragraph [0013].
(Continued)

*Primary Examiner* — Abdeltif Ajid
(74) *Attorney, Agent, or Firm* — Guang Y. Zhang; Holland & Hart LLP

(57) ABSTRACT

Methods, systems, and devices for wireless communications are described. In some systems, a user equipment (UE) may perform a random access (RACH) procedure based on a selected synchronization signal block (SSB). During this RACH procedure, a base station may transmit physical downlink control channel (PDCCH) messages for UE RACH message handling. To receive PDCCH signaling for RACH Messages 2, 3, or 4 (Msg 2/3/4), the UE may identify a set of time resources used by the base station for transmitting SSBs that are not quasi-co-located (QCL) with the
(Continued)

selected SSB. The UE may identify a Msg 2/3/4 search space that does not overlap with this identified set of resources, and may monitor this identified search space. The search space may correspond to a modified remaining minimum system information (RMSI) search space indicated by the base station, or a valid RMSI search space not indicated by the base station.

20 Claims, 16 Drawing Sheets

Related U.S. Application Data

(60) Provisional application No. 62/659,616, filed on Apr. 18, 2018.

(51) Int. Cl.
*H04L 5/00* (2006.01)
*H04L 27/26* (2006.01)
*H04W 24/08* (2009.01)
*H04W 56/00* (2009.01)
*H04W 72/044* (2023.01)
*H04W 72/23* (2023.01)
*H04W 80/02* (2009.01)

(52) U.S. Cl.
CPC ......... *H04L 27/2666* (2013.01); *H04W 24/08* (2013.01); *H04W 56/001* (2013.01); *H04W 72/046* (2013.01); *H04W 72/23* (2023.01); *H04W 80/02* (2013.01); *H04B 7/0413* (2013.01); *H04L 27/26025* (2021.01)

(56) References Cited

U.S. PATENT DOCUMENTS

| | | | |
|---|---|---|---|
| 2016/0309282 A1 | 10/2016 | Xu et al. | |
| 2016/0381668 A1 | 12/2016 | Lee et al. | |
| 2017/0251460 A1 | 8/2017 | Agiwal et al. | |
| 2018/0027594 A1 | 1/2018 | Nagaraja et al. | |
| 2018/0084593 A1 | 3/2018 | Chen et al. | |
| 2019/0222357 A1* | 7/2019 | Huang | H04W 72/0446 |
| 2019/0222391 A1* | 7/2019 | Lee | H04L 1/0038 |
| 2019/0254110 A1* | 8/2019 | He | H04L 41/0896 |
| 2019/0327767 A1 | 10/2019 | Islam et al. | |
| 2020/0228275 A1 | 7/2020 | Li et al. | |
| 2020/0305129 A1* | 9/2020 | Lee | H04L 1/1854 |
| 2020/0351924 A1* | 11/2020 | Seo | H04L 5/0053 |
| 2020/0367288 A1* | 11/2020 | Dahlman | H04W 74/0833 |
| 2021/0037575 A1* | 2/2021 | Ohara | H04W 72/20 |

FOREIGN PATENT DOCUMENTS

| | | |
|---|---|---|
| CN | 107889549 A | 4/2018 |
| WO | 2016172186 | 10/2016 |
| WO | 2017011093 A1 | 1/2017 |
| WO | 2018008916 A2 | 1/2018 |
| WO | 2018030793 A1 | 2/2018 |

OTHER PUBLICATIONS

International Preliminary Report on Patentability—PCT/US2019/019382, The International Bureau of WIPO—Geneva, Switzerland, Oct. 29, 2020.
International Search Report and Written Opinion—PCT/US2019/019382—ISA/EPO—May 15, 2019.
Qualcomm Incorporated: "Remaining Details on RACH Procedure", 3GPP TSG-RAN WG1 Meeting RAB1 #92bis, R1-1804779, Sanya, China, Apr. 16, 2018-Apr. 20, 2018, pp. 1-12, Aug. 7, 2018, [retrieved on Feb. 20, 2023].
Qualcomm Incorporated: "Remaining Details on RACH Procedure", 3GPP TSG-RAN WG1 Meeting RAN1 #93, R1-1807333, Busan, Korea, May 21, 2018-May 25, 2018, pp. 1-12, May 12, 2018, [retrieved on Feb. 20, 2023].
Qualcomm Incorporated: "Remaining Details on RACH Procedure", 3GPP TSG-RAN WG1 Meeting RAN1 92bis, 3GPP Draft; R1-1805527, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, 15 Pages, XP051427515, p. 4-p. 14, sections, 6, 7, p. 6-p. 8.
Qualcomm Incorporated: "Summary of Remaining Details on RACH Procedure," 3GPP Draft; R1-1805566, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 16, 2018, XP051427569, 20 pages, the whole document.
Taiwan Search Report—TW108106292—TIPO—Mar. 21, 2022.
Taiwan Search Report—TW111145815—TIPO—Aug. 18, 2023.

* cited by examiner

SEARCH SPACE CONFIGURATIONS FOR RANDOM ACCESS MESSAGING

CROSS REFERENCES

The present application for patent is a continuation of U.S. patent application Ser. No. 16/282,614 by Islam et al., entitled "SEARCH SPACE CONFIGURATIONS FOR RANDOM ACCESS MESSAGING," filed Feb. 22, 2019, which claims the benefit of U.S. Provisional Patent Application No. 62/659,616 by Islam et al., entitled "SEARCH SPACE CONFIGURATIONS FOR RANDOM ACCESS MESSAGING," filed Apr. 18, 2018, assigned to the assignee hereof, and expressly incorporated by reference in its entirety herein.

BACKGROUND

The following relates generally to wireless communications, and more specifically to search space configurations for random access (RACH) messaging.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may perform a RACH procedure with a base station to gain access to the wireless network. This RACH procedure may include the communication of a number of messages between the UE and base station, including RACH message 1 (Msg1), message 2 (Msg2), message 3 (Msg3), and message 4 (Msg4) transmissions. RACH Msg1 may include a RACH preamble transmission from the UE to the base station, RACH Msg2 may include a random access response (RAR) message transmitted in response, RACH Msg3 may include a radio resource control (RRC) connection request transmitted from the UE to the base station, and RACH Msg4 may include a medium access control (MAC) control element (CE) for contention resolution transmitted by the base station in response. Each of these RACH messages may be associated with information transmitted by the base station on the downlink (e.g., scheduling grants transmitted as physical downlink control channel (PDCCH) transmissions). However, the UE may not be able to efficiently determine resources on which to receive these PDCCH transmissions without interrupting reception of other transmissions (e.g., synchronization signaling).

SUMMARY

The described techniques relate to improved methods, systems, devices, or apparatuses that support search space configurations for random access (RACH) messaging. Generally, the described techniques provide for a user equipment (UE) to perform a RACH procedure while maintaining the capability to receive non-quasi-co-located (QCL) transmissions. The UE may initiate the RACH procedure with a base station based on a selected synchronization signal block (SSB). During this RACH procedure, the base station may transmit physical downlink control channel (PDCCH) messages to the UE for RACH message handling (e.g., scheduling). To receive the PDCCH signaling for RACH Messages 2, 3, or 4 (Msg 2/3/4), the UE may identify a set of time resources used by the base station for transmitting SSBs that are not QCL with the selected SSB. The UE may identify a Msg 2/3/4 search space that does not overlap with this identified set of resources, and may monitor the identified search space. In some cases, the Msg 2/3/4 search space may correspond to a modified remaining minimum system information (RMSI) search space indicated by the base station (e.g., modified by removing resources conflicting in time with the non-QCL SSBs), or a valid RMSI search space not indicated by the base station (e.g., where the resources of the valid RMSI search space do not conflict in time with the non-QCL SSBs). As a result, the UE may receive a configuration for the Msg 2/3/4 search space, and may remove resources from the configured search space that overlap in time with the non-QCL SSBs. The UE may receive the PDCCH transmissions and the non-QCL SSBs from the base station based on the design of the identified search space.

A method for wireless communications at a UE is described. The method may include transmitting, to a base station, a first RACH message based on an SSB received by the UE on a first receive beam, identifying a set of time resources used by the base station for transmission of one or more other SSBs from the base station, identifying a search space for receiving a PDCCH message based on the first RACH message, where the identified search space includes time resources that are different from the identified set of time resources, and monitoring for the PDCCH message in the identified search space.

An apparatus for wireless communications at a UE is described. The apparatus may include means for transmitting, to a base station, a first RACH message based on an SSB received by the UE on a first receive beam, means for identifying a set of time resources used by the base station for transmission of one or more other SSBs from the base station, means for identifying a search space for receiving a PDCCH message based on the first RACH message, where the identified search space includes time resources that are different from the identified set of time resources, and means for monitoring for the PDCCH message in the identified search space.

Another apparatus for wireless communications at a UE is described. The apparatus may include a processor, memory in electronic communication with the processor, and instructions stored in the memory. The instructions may be operable to cause the processor to transmit, to a base station, a first RACH message based on an SSB received by the UE on a first receive beam, identify a set of time resources used by the base station for transmission of one or more other SSBs from the base station, identify a search space for receiving a PDCCH message based on the first RACH message, where the identified search space includes time resources that are different from the identified set of time resources, and monitor for the PDCCH message in the identified search space.

A non-transitory computer-readable medium for wireless communications at a UE is described. The non-transitory computer-readable medium may include instructions operable to cause a processor to transmit, to a base station, a first RACH message based on an SSB received by the UE on a first receive beam, identify a set of time resources used by the base station for transmission of one or more other SSBs from the base station, identify a search space for receiving a PDCCH message based on the first RACH message, where the identified search space includes time resources that are different from the identified set of time resources, and monitor for the PDCCH message in the identified search space.

In some examples of the method, apparatus, and non-transitory computer-readable medium described herein, the PDCCH message includes a PDCCH grant for a RACH message 2 (Msg2) transmission, a PDCCH grant for a RACH message 3 (Msg3) transmission, a PDCCH grant for a RACH message 4 (Msg4) transmission, or a combination thereof.

In some examples of the method, apparatus, and non-transitory computer-readable medium described herein, the one or more other SSBs may be received by the UE on receive beams that may be different from the first receive beam.

Some examples of the method, apparatus, and non-transitory computer-readable medium described herein may further include processes, features, means, or instructions for identifying an RMSI search space corresponding to the SSB and configured via a physical broadcast channel (PBCH) configuration.

In some examples of the method, apparatus, and non-transitory computer-readable medium described herein, identifying the search space further includes removing time resources from the identified RMSI search space that overlap with the identified set of time resources, where the identified search space includes remaining time resources of the identified RMSI search space.

In some examples of the method, apparatus, and non-transitory computer-readable medium described herein, removing the time resources for the identified RMSI search space includes altering a slot-level periodicity of the identified RMSI search space, where the identified search space includes same symbol index locations as the identified RMSI search space but with the altered slot-level periodicity of the identified RMSI search space.

In some examples of the method, apparatus, and non-transitory computer-readable medium described herein, identifying the search space further includes determining to implement a default search space based on an RMSI transmission from the base station. Some examples of the method, apparatus, and non-transitory computer-readable medium described herein may further include processes, features, means, or instructions for identifying monitoring occasions for monitoring for the PDCCH message based on monitoring occasions of the RMSI search space.

In some examples of the method, apparatus, and non-transitory computer-readable medium described herein, identifying the search space further includes identifying an RMSI search space with time resources non-overlapping with the identified set of time resources, where the identified search space includes the identified RMSI search space.

Some examples of the method, apparatus, and non-transitory computer-readable medium described herein may further include processes, features, means, or instructions for receiving, from the base station, an indication of a set of time resources for the search space. Some examples of the method, apparatus, and non-transitory computer-readable medium described herein may further include processes, features, means, or instructions for removing time resources of the identified set of time resources from the indicated set of time resources for the search space, where the identified search space includes remaining time resources of the indicated set of time resources for the search space.

In some examples of the method, apparatus, and non-transitory computer-readable medium described herein, the indication of the set of time resources for the search space includes a time window for the search space. In some examples of the method, apparatus, and non-transitory computer-readable medium described herein, a subset of slots of the time window include the identified search space. In some examples of the method, apparatus, and non-transitory computer-readable medium described herein, the subset of slots includes each slot of the time window.

In some examples of the method, apparatus, and non-transitory computer-readable medium described herein, identifying the search space further includes identifying a start of the search space based on transmitting the first RACH message and identifying an end of the search space based on a response timer. In some examples of the method, apparatus, and non-transitory computer-readable medium described herein, the response timer includes a random access response (RAR) window, a contention resolution timer, or a combination thereof.

Some examples of the method, apparatus, and non-transitory computer-readable medium described herein may further include processes, features, means, or instructions for receiving the SSB from the base station, where the first RACH message may be transmitted in a RACH occasion corresponding to the SSB.

Some examples of the method, apparatus, and non-transitory computer-readable medium described herein may further include processes, features, means, or instructions for selecting the first receive beam, where the identified search space may be monitored using the selected first receive beam during the time resources that may be different from the identified set of time resources. Some examples of the method, apparatus, and non-transitory computer-readable medium described herein may further include processes, features, means, or instructions for selecting a second receive beam different from the selected first receive beam. Some examples of the method, apparatus, and non-transitory computer-readable medium described herein may further include processes, features, means, or instructions for monitoring for at least one SSB of the one or more other SSBs using the selected second receive beam during the identified set of time resources.

Some examples of the method, apparatus, and non-transitory computer-readable medium described herein may further include processes, features, means, or instructions for receiving the at least one SSB of the one or more other SSBs from the base station based on the time resources for the identified search space not overlapping with the identified set of time resources.

Some examples of the method, apparatus, and non-transitory computer-readable medium described herein may further include processes, features, means, or instructions for receiving the PDCCH message in control channel elements (CCEs) of the identified search space based on the monitoring.

In some examples of the method, apparatus, and non-transitory computer-readable medium described herein, the one or more other SSBs include one or more SSBs actually transmitted by the base station.

Some examples of the method, apparatus, and non-transitory computer-readable medium described herein may further include processes, features, means, or instructions for receiving, from the base station, an indication of the one or more SSBs actually transmitted by the base station in RMSI, other system information (OSI), a radio resource control (RRC) message, a medium access control (MAC) control element (CE), a handover message, or a combination thereof.

In some examples of the method, apparatus, and non-transitory computer-readable medium described herein, locations of the one or more other SSBs may be fixed.

A method for wireless communications at a base station is described. The method may include receiving, from a UE, a first RACH message based on an SSB received by the UE on a first receive beam, identifying a set of time resources used for transmission of one or more other SSBs by the base station, identifying a search space for the UE to receive a PDCCH message based on the first RACH message, where the identified search space includes time resources that are different from the identified set of time resources, mapping the PDCCH message to CCEs within the identified search space, and transmitting, to the UE, the PDCCH message according to the mapping.

An apparatus for wireless communications at a base station is described. The apparatus may include means for receiving, from a UE, a first RACH message based on an SSB received by the UE on a first receive beam, means for identifying a set of time resources used for transmission of one or more other SSBs by the base station, means for identifying a search space for the UE to receive a PDCCH message based on the first RACH message, where the identified search space includes time resources that are different from the identified set of time resources, means for mapping the PDCCH message to CCEs within the identified search space, and means for transmitting, to the UE, the PDCCH message according to the mapping.

Another apparatus for wireless communications at a base station is described. The apparatus may include a processor, memory in electronic communication with the processor, and instructions stored in the memory. The instructions may be operable to cause the processor to receive, from a UE, a first RACH message based on an SSB received by the UE on a first receive beam, identify a set of time resources used for transmission of one or more other SSBs by the base station, identify a search space for the UE to receive a PDCCH message based on the first RACH message, where the identified search space includes time resources that are different from the identified set of time resources, map the PDCCH message to CCEs within the identified search space, and transmit, to the UE, the PDCCH message according to the mapping.

A non-transitory computer-readable medium for wireless communications at a base station is described. The non-transitory computer-readable medium may include instructions operable to cause a processor to receive, from a UE, a first RACH message based on an SSB received by the UE on a first receive beam, identify a set of time resources used for transmission of one or more other SSBs by the base station, identify a search space for the UE to receive a PDCCH message based on the first RACH message, where the identified search space includes time resources that are different from the identified set of time resources, map the PDCCH message to CCEs within the identified search space, and transmit, to the UE, the PDCCH message according to the mapping.

In some examples of the method, apparatus, and non-transitory computer-readable medium described herein, the PDCCH message includes a PDCCH grant for a RACH Msg2 transmission, a PDCCH grant for a RACH Msg3 transmission, a PDCCH grant for a RACH Msg4 transmission, or a combination thereof.

In some examples of the method, apparatus, and non-transitory computer-readable medium described herein, the one or more other SSBs may be received by the UE on receive beams that may be different from the first receive beam.

Some examples of the method, apparatus, and non-transitory computer-readable medium described herein may further include processes, features, means, or instructions for identifying an RMSI search space corresponding to the SSB and configured via a PBCH configuration.

In some examples of the method, apparatus, and non-transitory computer-readable medium described herein, identifying the search space further includes removing time resources from the identified RMSI search space that overlap with the identified set of time resources, where the identified search space includes remaining time resources of the identified RMSI search space.

In some examples of the method, apparatus, and non-transitory computer-readable medium described herein, removing the time resources for the identified RMSI search space includes altering a slot-level periodicity of the identified RMSI search space, where the identified search space comprises same symbol index locations as the identified RMSI search space but with the altered slot-level periodicity of the identified RMSI search space.

In some examples of the method, apparatus, and non-transitory computer-readable medium described herein, identifying the search space further includes identifying an RMSI search space with time resources non-overlapping with the identified set of time resources, where the identified search space includes the identified RMSI search space.

Some examples of the method, apparatus, and non-transitory computer-readable medium described herein may further include processes, features, means, or instructions for transmitting, to the UE, an indication of a set of time resources for the search space. Some examples of the method, apparatus, and non-transitory computer-readable medium described herein may further include processes, features, means, or instructions for removing time resources of the identified set of time resources from the indicated set of time resources for the search space, where the identified search space includes remaining time resources of the indicated set of time resources for the search space.

In some examples of the method, apparatus, and non-transitory computer-readable medium described herein, the indication of the set of time resources for the search space includes a time window for the search space. In some examples of the method, apparatus, and non-transitory computer-readable medium described herein, a subset of slots of the time window include the identified search space. In some examples of the method, apparatus, and non-transitory computer-readable medium described herein, the subset of slots includes each slot of the time window.

Some examples of the method, apparatus, and non-transitory computer-readable medium described herein may further include processes, features, means, or instructions for transmitting, to the UE, the SSB, where the first RACH message may be received in a RACH occasion corresponding to the SSB.

DETAILED DESCRIPTION

Figure 1:
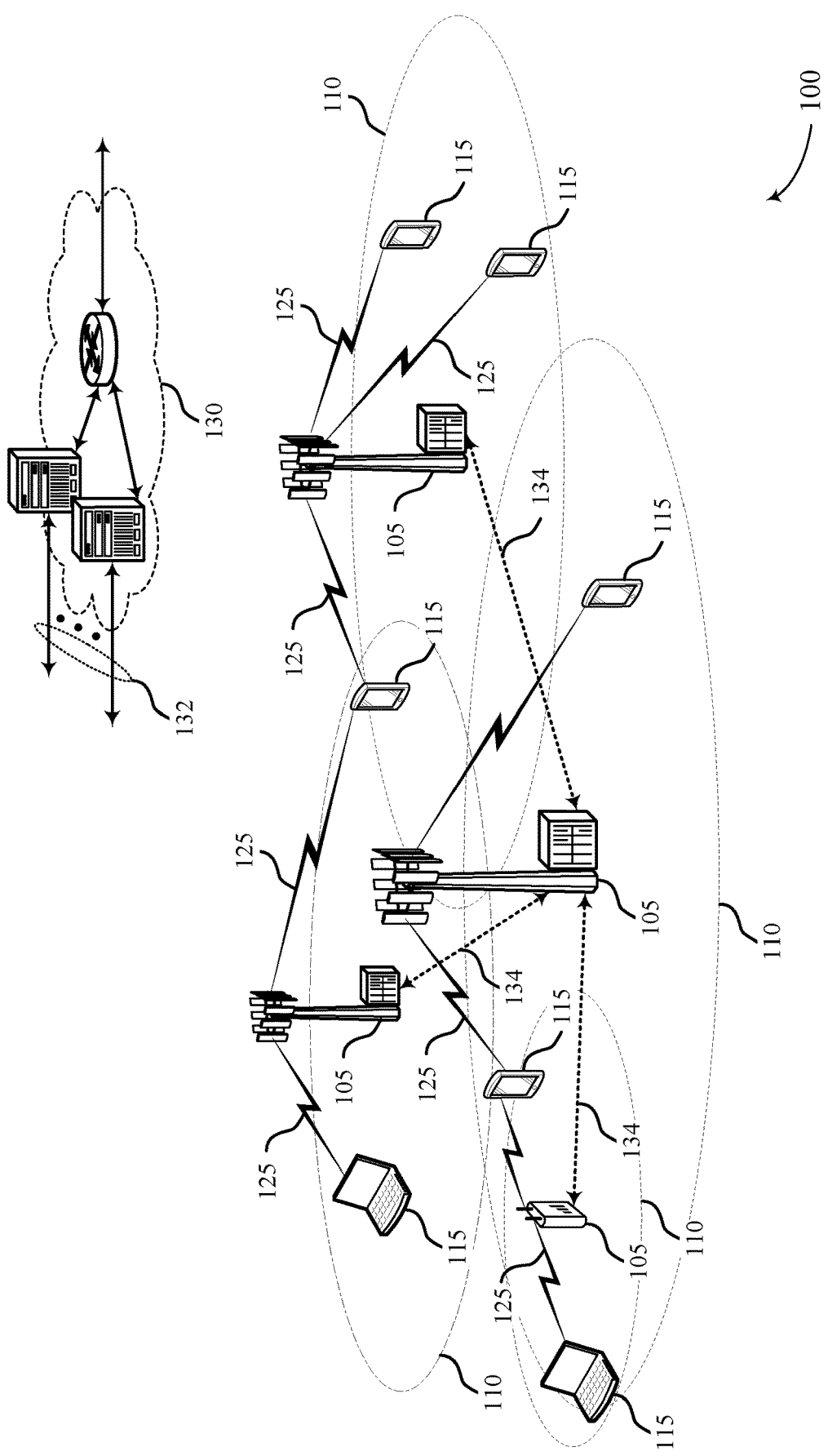
FIGS. 1 and 2 illustrate examples of wireless communications systems that support search space configurations for random access (RACH) messaging in accordance with aspects of the present disclosure.

In some wireless communications systems (e.g., new radio (NR) systems), a user equipment (UE) may perform a random access (RACH) procedure with a base station to gain access to the wireless network. This RACH procedure may include the communication of a number of messages between the UE and base station, including RACH message 1 (Msg1), message 2 (Msg2), message 3 (Msg3), and message 4 (Msg4) transmissions. The UE may transmit the RACH Msg1 (e.g., a RACH preamble transmission) to the base station to initiate the RACH procedure. In some cases, the UE may receive a set of synchronization signal blocks (SSBs) from the base station, and may select one of the SSBs to utilize for the RACH Msg1 transmission. The base station may respond to the RACH Msg1 with a RACH Msg2 (e.g., a random access response (RAR) message within a RAR window). The UE may then transmit a RACH Msg3 (e.g., a radio resource control (RRC) connection request) and receive a RACH Msg4 (e.g., a medium access control (MAC) control element (CE) for contention resolution) from the base station in response. The scheduling of each of these messages may be based on physical downlink control channel (PDCCH) signaling from the base station to the UE. In order to receive the PDCCH signaling (e.g., a PDCCH grant) while supporting efficient retransmission capabilities, the UE may identify RACH message 2, 3, or 4 (Msg 2/3/4) search spaces to monitor for the corresponding PDCCH transmissions.

For example, the UE may identify a set of SSB transmissions performed by the base station. In some cases, the UE may determine this set of SSBs based on remaining minimum system information (RMSI) signaling from the base station. The UE may identify SSBs of the set of SSBs that are not quasi-co-located (QCL) with the selected SSB for the RACH procedure and may determine time resources used by the base station for these non-QCL SSB transmissions. The UE may identify a search space (e.g., a default or configured Msg 2/3/4 search space) that does not overlap with the time resources for these non-QCL SSBs. This may allow the UE to switch receive beams in order to monitor for PDCCH transmissions in the Msg 2/3/4 search space and monitor for the non-QCL SSBs.

In a first example, the UE may determine an RMSI search space configured via a physical broadcast channel (PBCH) transmission and may modify the RMSI search space by removing any resources that conflict in time with the time resources for the non-QCL SSBs. The UE may identify a Msg 2/3/4 search space contained within a response window (e.g., a RAR window) using the monitoring occasions of the modified RMSI search space. In a second example, the UE may use a valid RMSI search space that does not overlap with the time resources for the non-QCL SSBs as the Msg 2/3/4 search space, where the valid RMSI search space may not be signaled in the PBCH. In a third example, the UE may receive a Msg 2/3/4 search space configuration from the base station. This configuration may include a time range and symbol allocation across the time range—as opposed to specific symbol allocations for each slot—for reduced configuration signaling overhead. The identified Msg 2/3/4 search space may be based on the indicated time range and symbol allocation, but may remove resources from the configuration that overlap with the time resources for the non-QCL SSBs. In any of the examples described herein, the UE may monitor the identified search space to receive PDCCH transmissions while maintaining the ability to receive non-QCL SSBs from the base station. Receiving these non-QCL SSBs may reduce latency and improve reliability of RACH message retransmissions by the UE during the RACH procedure.

Aspects of the disclosure are initially described in the context of wireless communications systems. Additional aspects of the disclosure are described with respect to signaling timelines, multiplexing patterns, and process flows. Aspects of the disclosure are further illustrated by and described with reference to apparatus diagrams, system diagrams, and flowcharts that relate to search space configurations for RACH messaging.

FIG. 1 illustrates an example of a wireless communications system 100 that supports search space configurations for RACH messaging in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (STTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a UE 115 may perform a RACH procedure with a base station 105 to gain access to the wireless network. This RACH procedure may include the communication of a number of messages between the UE 115 and base station 105, including RACH Msg1, Msg2, Msg3, and Msg4 transmissions. The UE 115 may transmit the RACH Msg1 (e.g., a RACH preamble transmission) to the base station 105 to initiate the RACH procedure. In some cases, the UE 115 may receive a set of SSBs from the base station 105, and may select one of the SSBs to utilize for the RACH Msg1 transmission. The base station 105 may respond to the RACH Msg1 with a RACH Msg2 (e.g., a RAR message within a RAR window). The UE 115 may then transmit a RACH Msg3 (e.g., an RRC connection request), and receive a RACH Msg4 (e.g., a MAC CE for contention resolution) from the base station 105 in response. The scheduling of each of these messages may be based on PDCCH signaling from the base station 105 to the UE 115. In order to receive the PDCCH signaling while supporting efficient retransmission capabilities, the UE 115 may identify RACH Msg 2/3/4 search spaces to monitor for the corresponding PDCCH transmissions.

For example, the UE 115 may identify a set of SSB transmissions performed by the base station 105. In some cases, the UE 115 may determine this set of SSBs based on RMSI signaling from the base station 105. The UE 115 may identify SSBs of the set of SSBs that are not QCL with the selected SSB for the RACH procedure, and may determine time resources used by the base station 105 for these non-QCL SSB transmissions. The UE 115 may identify a search space (e.g., a default or configured Msg 2/3/4 search space) that does not overlap with the time resources for these non-QCL SSBs.

In a first example, the UE 115 may determine an RMSI search space configured via a PBCH transmission, and may modify the RMSI search space by removing any resources that conflict in time with the time resources for the non-QCL SSBs. The UE 115 may identify a Msg 2/3/4 search space contained within a response window (e.g., a RAR window) using the monitoring occasions of the modified RMSI search space. In a second example, the UE 115 may use a valid RMSI search space that does not overlap with the time resources for the non-QCL SSBs as the Msg 2/3/4 search space, where the valid RMSI search space may not be signaled in the PBCH. In a third example, the UE 115 may receive a Msg 2/3/4 search space configuration from the base station 105. This configuration may include a time range and symbol allocation across the time range—as opposed to specific symbol allocations for each slot—for reduced configuration signaling overhead. The identified Msg 2/3/4 search space may be based on the indicated time range and symbol allocation, but may remove resources from the configuration that overlap with the time resources for the non-QCL SSBs. In any of the examples described herein, the UE 115 may monitor the identified search space to receive PDCCH transmissions while maintaining the ability to receive non-QCL SSBs from the base station 105. Receiving these non-QCL SSBs may reduce latency and improve reliability of RACH message retransmissions by the UE 115 during the RACH procedure.

Figure 2:
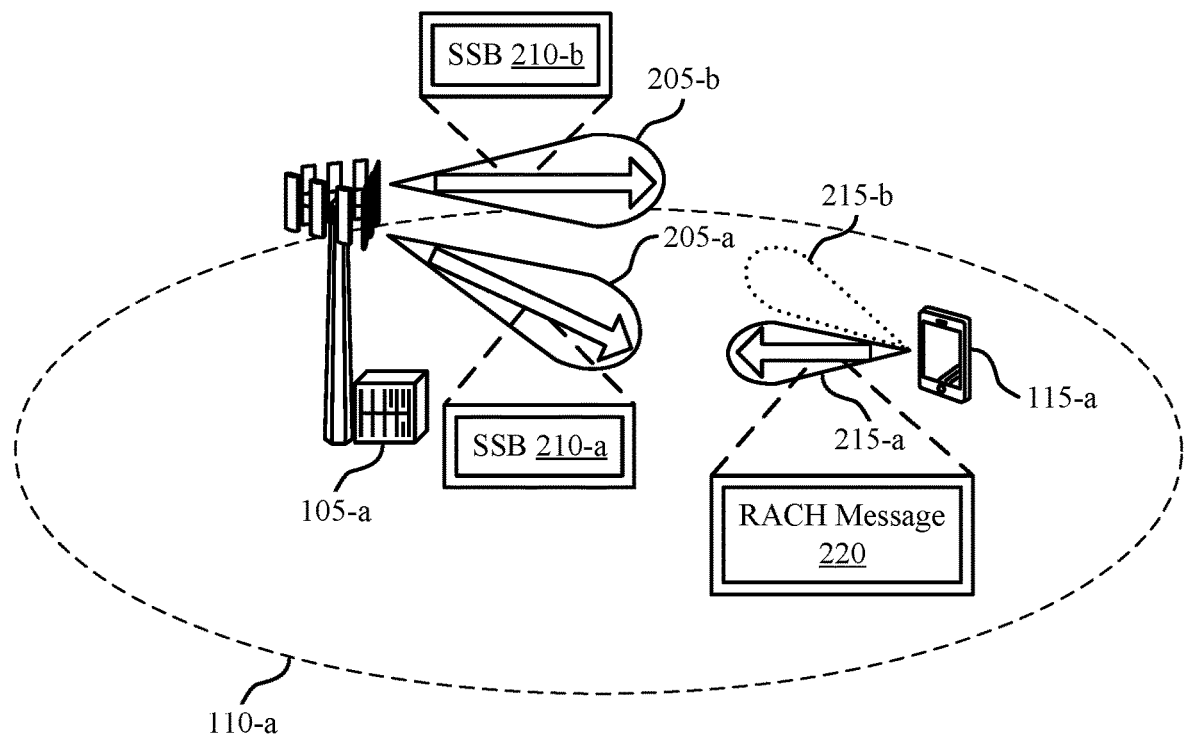

FIG. 2 illustrates an example of a wireless communications system 200 that supports search space configurations for RACH message responses in accordance with aspects of the present disclosure. The wireless communications system 200 may include base station 105-*a* and UE 115-*a*, which may be examples of a base station 105 and a UE 115 as described with reference to FIG. 1. Base station 105-*a* may provide network coverage for geographic coverage area 110-*a*. As illustrated, UE 115-*a* may perform a RACH procedure to gain access to the network. The RACH procedure may involve UE 115-*a* receiving downlink RACH messaging in a default or configured search space.

For example, base station 105-*a* may periodically or aperiodically transmit a set of SSBs 210 on different transmit beams 205 (e.g., in a beam-sweep procedure). These different SSBs 210 may be transmitted by QCL or non-QCL antennas at the base station 105-*a*. For UE 115-*a* to access the network, UE 115-*a* may monitor for SSBs 210 transmitted by base station 105-*a*. In some cases, UE 115-*a* may detect and decode multiple SSBs 210 from base station 105-*a* on different receive beams 215. For example, base station 105-*a* may transmit SSB 210-*a* on transmit beam 205-*a* and SSB 210-*b* on transmit beam 205-*b*, and UE 115-*a* may receive the SSBs 210 on receive beam 215-*a* and receive beam 215-*b*, respectively. UE 115-*a* may select one of these SSBs 210 (e.g., based on a receive power or channel quality associated with the SSB 210) and may perform a RACH procedure based on information in the selected SSB 210. For example, UE 115-*a* may select SSB 210-*a* and may transmit a RACH message 220 based on information or parameters in SSB 210-*a*. This RACH message 220 may be an example of a RACH Msg1 or a RACH Msg3.

UE 115-*a* may monitor for a PDCCH signal. This signal may be PDCCH components of a RACH Msg2, a RACH Msg3, or a RACH Msg4 (RACH Msg 2/3/4), such as a PDCCH grant. For example, the PDCCH signal may be a response to the RACH message 220. In order to handle the RACH Msg 2/3/4, UE 115-*a* may monitor a search space for scheduling assignments or scheduling grants corresponding to the RACH Msg 2/3/4. The search space may include a set of carrier channels formed by control channel elements (CCEs) at a specific aggregation level. In some cases, UE 115-*a* may monitor multiple search spaces on same or different aggregation levels. UE 115-*a* may attempt to decode (e.g., blind decode) any PDCCHs formed by the CCEs within a search space for the UE 115-*a*. If a decoded PDCCH passes a parity check (e.g., a CRC), the UE 115-*a* may process the contents of the PDCCH. Processing this information may allow UE 115-*a* to correctly transmit or receive certain RACH messages, such as RACH Messages 2, 3, or 4.

In some cases, UE 115-*a* may receive (e.g., via a PBCH transmission or SSB 210) a configuration of the search space. This configuration may specify symbol indices, slots, etc. for the search space, may specify a time range for the search space, or may specify a specific search space (e.g., with a random access search space higher layer parameter for a Type1-PDCCH common search space). In other cases, UE 115-*a* may not receive a configuration for the search space. In these cases, UE 115-*a* may identify a default search space to utilize in order to receive the PDCCH information. In some cases, this default search space may be based on an RMSI search space (e.g., a Type0-PDCCH common search space). For example, the default search space may share an association between monitoring occasions and SSBs 210 or PBCH transmissions with the RMSI search space. This default Msg 2/3/4 search space may be based on a response window (e.g., a RAR window) for the RACH message 220.

However, simply using the configured RMSI search space for the default Msg 2/3/4 search space may result in timing issues. For example, UE 115-*a* may utilize a specific RMSI periodicity (e.g., 20 ms, if the control resource set (CORESET) for the RMSI search space is TDM with the SSBs 210). However, UE 115-*a* may implement a RAR window of a different length or maximum length (e.g., 10 ms), which may be shorter than the RMSI periodicity. In certain cases, the RMSI search space may not be located within the RAR window (e.g., based on the longer repetition between repeat RMSI search spaces than the window). Accordingly, UE 115-*a* may determine to retransmit the RACH message 220 based on the completion of the RAR window before monitoring for the response based on the RMSI search space (e.g., the RAR search space may not be present within the RAR window if the RAR search space directly corresponds to the RMSI search space). Additionally, in some cases, UE 115-*a* may not be able to track SSBs 210 transmitted by base station 105-*a* in symbols used by UE 115-*a* for monitoring the search space for PDCCH transmissions.

To better handle search space timing, the search space may be based on actually transmitted SSBs 210. For example, base stations 105 may support a number of SSBs 210 (e.g., sixty-four total SSBs 210). Each SSB 210 of this group of SSBs 210 may or may not be QCL, and UE 115-*a* may treat the SSBs 210 as if the SSBs 210 are non-QCL (e.g., whether or not this assumption is technically correct). Each SSB 210 of this group of SSBs 210 may correspond to a specific transmission direction. In some cases, base station 105-*a* may use a subset of this group of SSBs 210 and may not use the other SSBs 210 based on a configuration or deployment of base station 105-*a*. Base station 105-*a* may indicate the SSBs 210 that base station 105-*a* actually transmits in the RMSI (e.g., using SSB indices, where each SSB index corresponds to an actually transmitted SSB 210 and a transmission time for the SSB 210). UE 115-*a* may identify a set of time resources used for actual SSB 210 transmissions by base station 105-*a* that are not QCL with the selected SSB 210. The search space (e.g., configured or default) for UE 115-*a* may avoid overlapping this identified set of time resources.

In a first example, resources may be removed from a search space to result in the Msg 2/3/4 search space. For example, for a configured search space, UE 115-*a* may remove any resources from the configured search space overlapping in time with the identified set of time resources (e.g., the time resources used for actual SSB 210 transmissions that are non-QCL with a selected SSB 210 transmission). For a default search space, UE 115-*a* may identify an RMSI search space (e.g., indicated in an SSB 210 or PBCH transmission). UE 115-*a* may use the symbol locations of the RMSI search space for the Msg 2/3/4 search space, but may remove any symbol locations overlapping with the identified set of time resources. In some cases, the Msg 2/3/4 may use the same symbol locations as the RMSI search space, but may use a different slot-level periodicity in order to avoid the identified set of time resources. For example, if there are twenty slots in a RAR window, and four of these slots have SSB symbol locations that overlap with symbol locations of the search space, the Msg 2/3/4 search space may be modified to remove these four slots and just span the other sixteen slots. In this way, the modified RMSI search space used for the Msg 2/3/4 search space may avoid timing conflicts with non-QCL SSBs 210. In some cases, this default search space may span the duration of a RAR window, starting from the end of the RACH message 220 transmission.

In a second example, a valid RMSI search space not overlapping in time with the identified set of time resources may be used for the Msg 2/3/4 search space. In some cases, UE 115-*a* may determine an RMSI search space indicated in an SSB 210 or PBCH transmission and may identify that the RMSI search space overlaps in timing resources with the identified set of time resources. UE 115-*a* may select a different RMSI search space than the one indicated based on this timing resource conflict. In other case, UE 115-*a* may automatically select a different RMSI search space no matter the indicated search space in the SSB 210 or PBCH transmission. In some cases, UE 115-*a* may select an RMSI search space with a CORESET that is TDM with the SSB 210 transmissions in order to avoid overlap in timing resources.

In any of the examples described herein, UE 115-*a* may identify the Msg 2/3/4 search space based on the described techniques. Base station 105-*a* may utilize similar techniques to determine the CCE resources to use for a PDCCH transmission (e.g., for a RACH Msg 2/3/4). Base station 105-*a* may transmit the PDCCH transmission using the same transmit beam 205-*a* as the selected SSB 210-*a*, and UE 115-*a* may monitor the channel using the same receive beam 215-*a* that received SSB 210-*a*. UE 115-*a* may monitor for the PDCCH transmission and the SSB 210-*a* using receive beam 215-*a* during the time resources of the identified Msg 2/3/4 search space and may monitor for non-QCL SSBs 210 (e.g., SSB 210-*b*) using different receive beams (e.g., receive beam 215-*b*) during the identified set of time resources. In this way, a UE 115 supporting a single receive beam may track non-QCL SSBs 210 during a RACH procedure in case retransmissions of the RACH message 220 are needed. For examples, any UEs 115 with a single antenna panel may implement this procedure to switch between receive beams.

Figure 3:
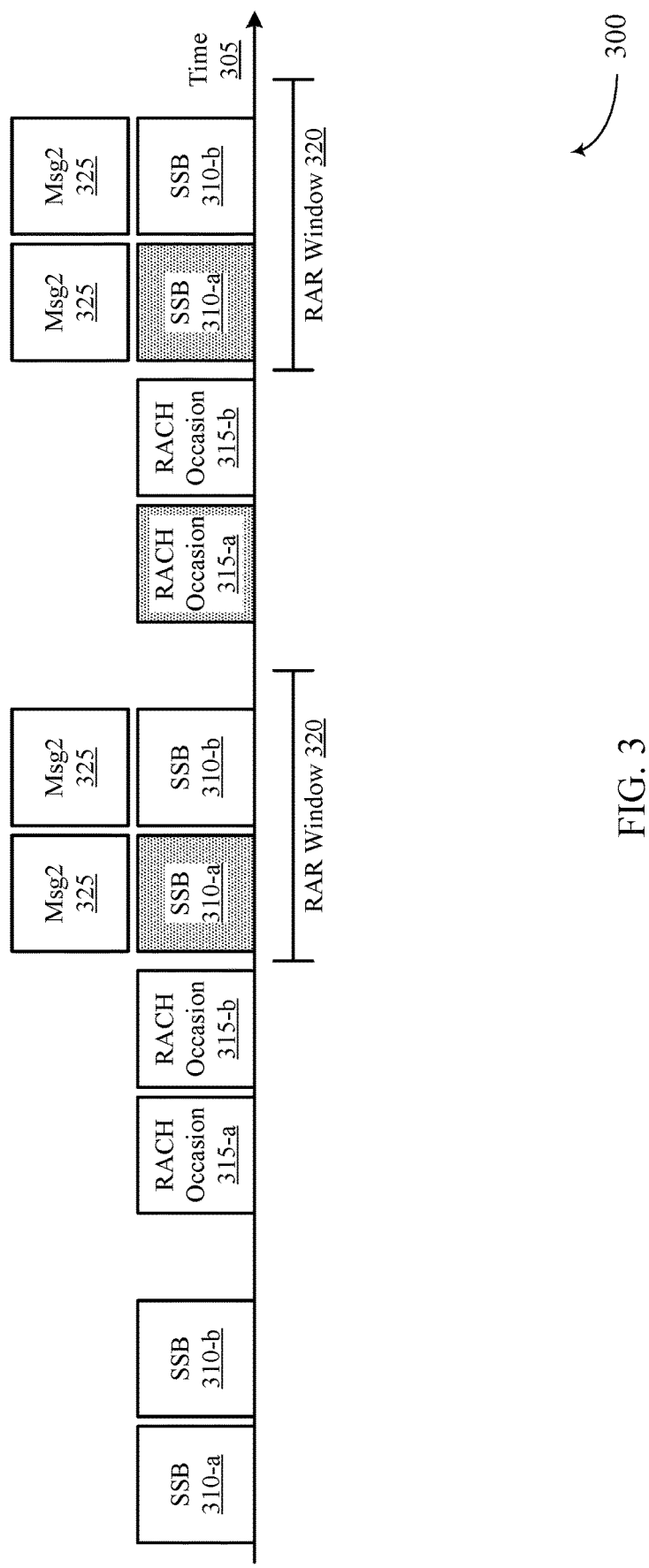
FIG. 3 illustrates an example of a signaling timeline that supports search space configurations for RACH messaging in accordance with aspects of the present disclosure.

FIG. 3 illustrates an example of a signaling timeline 300 that supports search space configurations for RACH message responses in accordance with aspects of the present disclosure. The signaling timeline 300 may illustrate approximate timing of processes at a UE 115, as described with reference to FIGS. 1 and 2. This approximate timing may correspond to symbol indexes or locations within one or more TTIs, such as slots or subframes. The timeline 300 may show reception of SSBs 310 at the UE 115, RACH occasions 315 corresponding to the received SSBs 310, and monitoring or reception of RACH Msg2 325 transmissions according to a default search space. These signals or processes may be repeated in time 305 based on a repetition process and a RAR window 320. While the signaling timeline 300 is described with respect to RACH Msg2 325 transmissions, the same or similar processes may be performed to receive PDCCH messages (e.g., grants) for any of the RACH messaging, including RACH Msg3 and RACH Msg4 transmissions.

In some examples, a UE 115 may receive multiple SSBs 310 from a base station 105. These SSBs 310 may be received at different times, and may be received from different antennas or beams at the base station 105 that are not QCL. Based on these SSBs 310 not being QCL, the UE 115 may receive a first SSB 310-*a* on a first receive beam, and may receive a second SSB 310-*b* on a second receive beam. In some cases, the UE 115 may receive an SSB 310 on multiple receive beams, and may select one of the receive beams to associate with the SSB 310 (e.g., based on a highest reference signal received power (RSRPs) of the receive beams). Additionally or alternatively, the UE 115 may receive other SSBs 310 on the first receive beam, the second receive beam, additional receive beams, or some combination thereof. The UE 115 may select one of the SSBs 310 for a RACH procedure. In some cases, the UE 115 may select the SSB 310 based on a signal quality, channel conditions, expected reliability, or some similar parameter associated with the SSB 310. As illustrated, the UE 115 may select SSB 310-*b*.

The UE 115 may perform a RACH message transmission in the RACH occasion 315 corresponding to the selected SSB 310-*b*. In some cases, each SSB 310 may correspond to a different RACH occasion 315 (e.g., SSB 310-*a* corresponding to RACH occasion 315-*a* and SSB 310-*b* corresponding to RACH occasion 315-*b*). The base station 105 may transmit the SSBs 310 at the beginning of a RACH configuration period, and the RACH occasions 315 may be located at the end of the RACH configuration period. The UE 115 may transmit a RACH message (e.g., a RACH Msg1) to the base station in RACH occasion 315-*b* based on selecting SSB 310-*b*.

The UE 115 may monitor for a response from the base station 105 to the transmitted RACH message. For example, the UE 115 may monitor for a response (e.g., a RACH Msg2 325 transmission) during a RAR window 320. If the UE 115 receives a response during the RAR window 320, the UE 115 may proceed with a next step of the access procedure (e.g., transmitting another type of RACH message, establishing a link, etc.). If the UE 115 does not receive a response during the RAR window 320, the UE 115 may retransmit the RACH message in another RACH occasion 315. If the RAR window 320 include no backoff period or a minimal backoff period, the UE 115 may retransmit the RACH message at any time following the RAR window 320 (e.g., any time corresponding to a RACH occasion 315).

The UE 115 may transmit the RACH message in RACH occasion 315-*b* according to the selected SSB 310-*b*. For example, the UE 115 may utilize a transmit beam based on the receive beam used to receive SSB 310-*b*, and may monitor for responses using the same receive beam. This may be based on demodulation reference signals (DMRSs) for the Msg2 grant being QCL with selected SSB 310-*b*, where the UE 115 can receive QCL transmission on a same receive beam, and may receive non-QCL transmissions on different receive beams. The UE 115 may monitor for responses during a RAR window 320. In some cases, the RAR window 320 may begin after or at transmission of the RACH message (e.g., the utilized RACH occasion 315-*b*) and may end based on a RAR timer or length. As illustrated, the RAR window 320 may overlap the SSB 310 locations.

If the UE 115 does not receive a search space configuration from the base station 105, the UE 115 may identify a default search space to utilize to monitor for a response to the transmitted RACH message. In other cases, the UE 115 may receive an indication of a search space configuration, where the search space configuration includes a start time and an end time. Whether implementing a default or configured search space for RACH response monitoring, the UE 115 may monitor one search space per TTI (e.g., slot). The starting symbol of the search space may remain the same for each of these slots. In some cases, the UE 115 may monitor the search space in each slot within the RAR window 320 (e.g., for a default search space where a start or end time is not indicated). For a default search space, the UE 115 may reuse symbol locations associated with an RMSI search space as the symbol locations for the default search space for the RACH response.

However, in some cases, utilizing a search space in each slot of the RAR window 320 may result in overlapping the search space with time resources used for SSB 310 transmissions. For example, the search space monitored by the UE 115 and an SSB 310 transmission by the base station 105 may share a symbol location. To differentiate between a RACH Msg2 325 transmission and an SSB 310 overlapping in time resources, the base station 105 and UE 115 may perform FDM. If these transmissions are QCL (e.g., such as SSB 310-*b* and the RACH Msg2 325), this FDM procedure may allow a same receive beam at the UE 115 to receive both of the transmissions. However, if these transmissions are not QCL (e.g., such as SSB 310-*a* and the RACH Msg2 325), the UE 115 may not receive the transmissions on a same receive beam using the FDM procedure. Accordingly (e.g., if the UE 115 operates using one receive beam at a time), the UE 115 may not be able to track SSB 310-*a* while monitoring for the response message on the receive beam corresponding to SSB 310-*b*.

In some cases, the UE 115 may not successfully receive and decode a RACH Msg2 325 transmission during the RAR window 320. In these cases, the completion of the RAR window 320 may trigger the UE 115 to retransmit the RACH message and again monitor for a response. If the UE 115 cannot track SSB 310-*a* during the RAR window 320 (e.g., due to overlapping time resources), the UE 115 may not utilize the RACH occasion 315-*a* corresponding to SSB 310-*a* that follows the RAR window 320. This may increase latency and reduce reliability of the RACH message transmissions. For example, assuming no backoff period—or an insignificant backoff period—the UE 115 may retransmit the RACH message in RACH occasion 315-*a* following the RAR window 320 if SSB 310-*a* is received, allowing the UE 115 to perform the retransmission faster than if the UE 115 waits to retransmit the RACH message in RACH occasion 315-*b*. However, if the UE 115 does not receive SSB 310-*a* during the RAR window 320 (e.g., due to monitoring a search space using a receive beam associated with SSB 310-*b*, not SSB 310-*a*), the UE 115 cannot utilize the corresponding RACH occasion 315-*a* for RACH retransmission, and waits for a later RACH occasion 315 (e.g., for which the UE 115 received a corresponding SSB 310) for retransmission. Additionally, not receiving a RACH Msg2 325 during the RAR window 320 may be due to problems with the channel (e.g., existence of interference, low signal-to-noise ratio (SNR), etc.). Repeating the transmission using SSB 310-*b* and corresponding RACH occasion 315-*b* may have a greater probability of failing than using a different SSB 310 and RACH occasion 315, as the same channel issues may persist across one or more retransmissions. By switching to a different SSB 310—and, correspondingly, a different RACH occasion 315—the UE 115 may improve the probability of receiving a RACH Msg2 325 transmission in response to the RACH message (e.g., due to different channel conditions).

The issues with tracking an SSB 310 (e.g., SSB 310-*a*) associated with a different receive beam than the RACH Msg2 325 monitoring may persist across RAR windows 320. For example, if the search space of RACH Msg 2/3/4 starts at the same symbol in each slot, and the SSB 310 is not QCL with the DMRS of Msg 2/3/4 and is transmitted at a same symbol in one or more slots, these time resources may overlap in each RAR window 320. Accordingly, the UE 115 may not be able to track SSBs 310 not QCL with the initially selected SSB 310-*b* during the entire retransmission procedure.

To handle this issue, the search spaces of Msg 2/3/4 may be defined to not overlap with SSBs that are not QCL with DMRS of the Msg 2/3/4. For example, the UE 115 may identify the SSBs 310 actually transmitted by the base station 105, and may determine time resources for these SSBs 310. Once the UE 115 selects an SSB 310 for a RACH transmission, the UE 115 may identify time resources used for transmissions of non-QCL SSBs 310. For example, if the UE 115 selects SSB 310-*b*, then the UE 115 may identify the time resources for transmission of non-QCL SSB 310-*a*. When the UE 115 determines the search space (e.g., a default or configured search space) for monitoring for responses, the UE 115 may avoid overlapping the search space time resources with the identified non-QCL SSB 310 time resources. In one case, this may involve identifying a search space, and modifying the search space to not overlap in these time resources (e.g., based on a priority level associated with the search space, the time resources, or both). For example, the UE 115 may alter the slot-periodicity of a search space, or may modify the search space at the symbol-level. In a second case, this may involve selecting a search space that does not overlap with the time resources for the identified non-QCL SSB 310.

In any of the cases described herein, by not overlapping the time resources of the search space and the non-QCL SSBs 310, the UE 115 may monitor for both the SSBs 310 and the RACH Msg2 325 transmission. For example, the UE 115 may monitor for the RACH Msg2 325 transmission and SSB 310-*b* using one receive beam at one time, and may switch to monitor for SSB 310-*a* using a different receive beam at a different time. This may allow the UE 115 to perform retransmissions with reduced latency and improved reliability, and may allow the UE 115 to efficiently utilize the RAR window 320.

Figure 4:
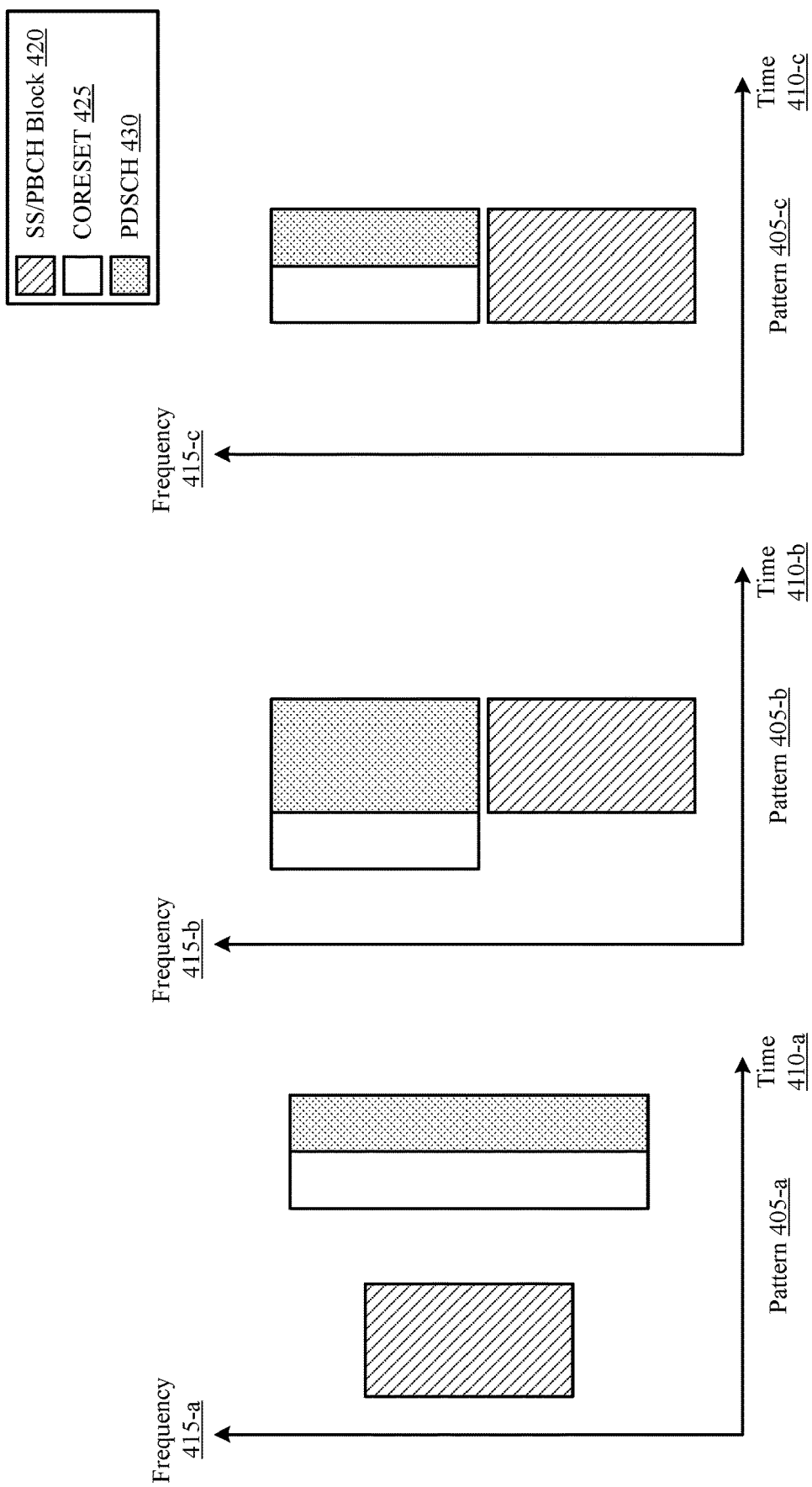
FIG. 4 illustrates examples of potential multiplexing patterns that support search space configurations for RACH messaging in accordance with aspects of the present disclosure.

FIG. 4 illustrates examples of potential multiplexing patterns 400 that support search space configurations for RACH messaging in accordance with aspects of the present disclosure. The potential multiplexing patterns 400 may be used by a base station 105 for transmission and by a UE 115 for reception, as described herein with reference to FIGS. 1 through 3. Each pattern 405 illustrates approximations of time 410 and frequency 415 resources used for an SS/PBCH block 420 (e.g., or any similar synchronization signals), a CORESET 425 (e.g., an RMSI PDCCH transmission), and a physical downlink shared channel (PDSCH) 430 (e.g., an RMSI PDSCH transmission). These are just a few examples of potential multiplexing patterns 400, and other patterns 405 may be implemented.

Pattern 405-a illustrates a TDM example. The SS/PBCH block 420, CORESET 425, and PDSCH 430 share frequency resources 415-a (e.g., at least a subset of frequency resources), but utilize different time resources 410-a. In some cases, a UE 115 may select a pattern such as this for an RMSI search space CORESET, so that the SS/PBCH block 420 and the CORESET 425 do not overlap in time resources 410-a. In these cases, the UE 115 may not remove time resources from the selected RMSI search space.

Pattern 405-b illustrates a combination of a TDM example and an FDM example. The SS/PBCH block 420 and PDSCH 430 may share time resources 410-b (e.g., at least a subset of time resources), but utilize different frequency resources 415-b. Meanwhile, the CORESET 425 may share frequency resources 415-b but not time resources 410-b with the PDSCH 430, and may not share either time or frequency resources with the SS/PBCH block 420. In this way, as with pattern 405-a, a UE 115 may select an RMSI search space with a CORESET 425 defined in this way to avoid overlapping the CORESET 425 and the SS/PBCH block 420 in time resources 410-b.

Pattern 405-c illustrates a combination of a TDM example and an FDM example. The CORESET 425 and PDSCH 430 may share frequency resources 415-c, but not time resources 410-c. Meanwhile, the SS/PBCH block 420 may share time resources 410-c but not frequency resources 415-c with the PDSCH 430 and the CORESET 425. In patterns 405 such as this, if a UE 115 selects an RMSI search space with a CORESET 425 defined in this way, the UE 115 may identify time resources 410-c of non-QCL SSBs/PBCH of the SS/PBCH block 420, and may remove these time resources 410-c from the CORESET 425 (e.g., to avoid overlapping these time resources 410-c).

If a UE 115 determines that a CORESET for an RMSI search space (e.g., a Type0-PDCCH common search space) is present, the UE 115 may determine a number of consecutive RBs and a number of consecutive symbols for the CORESET of the RMSI search space from a first set of bits (e.g., the four most significant bits of the RMSI PDCCH configuration), and may determine PDCCH monitoring occasions from a second set of bits (e.g., the four least significant bits of RMSI PDCCH configuration) included in a master information block (MIB). Tables 1 through 5, presented below, illustrate possible techniques for determining monitoring occasions based on specific parameters.

TABLE 1

Parameters for PDCCH monitoring occasions for Type0-PDCCH common search space - SS/PBCH block and CORESET multiplexing pattern 405-a and FR1

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |
| 5 | 5 | 2 | 1/2 | {0, if, is even}, {$N_{symb}^{CORESET}$, if i is odd} |
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

TABLE 2

Parameters for PDCCH monitoring occasions for Type0-PDCCH common search space - SS/PBCH block and CORESET multiplexing pattern 405-a and FR2

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 2.5 | 1 | 1 | 0 |
| 3 | 2.5 | 2 | 1/2 | {0, if i is even}, {7, if i is odd} |
| 4 | 5 | 1 | 1 | 0 |
| 5 | 5 | 2 | 1/2 | {0, if i is even}, {7, if i is odd} |
| 6 | 0 | 2 | 1/2 | {0, if i is even}, {$N_{symb}^{CORESET}$, if i is odd} |
| 7 | 2.5 | 2 | 1/2 | {0, if i is even}, {$N_{symb}^{CORESET}$, if i is odd} |
| 8 | 5 | 2 | 1/2 | {0, if i is even}, {$N_{symb}^{CORESET}$, if i is odd} |
| 9 | 7.5 | 1 | 1 | 0 |
| 10 | 7.5 | 2 | 1/2 | {0, if i is even}, {7, if i is odd} |
| 11 | 7.5 | 2 | 1/2 | {0, if i is even}, {$N_{symb}^{CORESET}$, if i is odd} |
| 12 | 0 | 1 | 2 | 0 |
| 13 | 5 | 1 | 2 | 0 |
| 14 | | | | Reserved |
| 15 | | | | Reserved |

TABLE 3

PDCCH monitoring occasions for Type0-PDCCH common search space - SS/PBCH block and CORESET multiplexing pattern 405-b and {SS/PBCH block, PDCCH} subcarrier spacing {120, 60} kHz

| Index | PDCCH monitoring occasions (SFN and slot number) | First symbol index (k = 0, 1, . . . 15) |
|---|---|---|
| 0 | $SFN_C = SFN_{SSB,j}$ $n_C = n_{SSB,j}$ | 0, 1, 6, 7 for i = 4k, i = 4k + 1, i = 4k + 2, i = 4k + 3 |

TABLE 3-continued

PDCCH monitoring occasions for Type0-PDCCH common search space - SS/PBCH block and CORESET multiplexing pattern 405-b and {SS/PBCH block, PDCCH} subcarrier spacing {120, 60} kHz

| Index | PDCCH monitoring occasions (SFN and slot number) | First symbol index (k = 0, 1, ... 15) |
|---|---|---|
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 4

PDCCH monitoring occasions for Type0-PDCCH common search space - SS/PBCH block and CORESET multiplexing pattern 405-b and {SS/PBCH block, PDCCH} subcarrier spacing {240, 120} kHz

| Index | PDCCH monitoring occasions (SFN and slot number) | First symbol index (k = 0, 1, ... , 7) |
|---|---|---|
| 0 | $SFN_C = SFN_{SSB,i}$<br>$n_C = n_{SSB,i}$ or $n_C = n_{SSB,i} - 1$ | 0, 1, 2, 3, 0, 1 in i = 8k,<br>i = 8k + 1, i = 8k + 2, i = 8k + 3,<br>i = 8k + 6, i = 8k + 7 ($n_C = n_{SSB,i}$)<br>12, 13 in i = 8k + 4, i = 8k + 5<br>($n_C = n_{SSB,i} - 1$) |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 5

PDCCH monitoring occasions for Type0-PDCCH common search space - SS/PBCH block and CORESET multiplexing pattern 405-c and {SS/PBCH block, PDCCH} subcarrier spacing {120, 120} kHz

| Index | PDCCH monitoring occasions (SFN and slot number) | First symbol index (k = 0, 1, ... 15) |
|---|---|---|
| 0 | $SFN_C = SFN_{SSB,i}$<br>$n_C = n_{SSB,i}$ | 4, 8, 2, 6 in<br>i = 4k, i = 4k + 1, i = 4k + 2,<br>i = 4k + 3 |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

In the above tables, $SFN_C$ and $n_C$ are the SFN and slot index of the CORESET based on subcarrier spacing of the CORESET, $SFN_{SSB,i}$ and $n_{SSB,i}$ are the SFN and slot index based on subcarrier spacing of the CORESET when the SS/PBCH block 420 with index i overlaps in time with system frame $SFN_{SSB,i}$ and slot $n_{SSB,i}$.

In some cases, an offset may be defined with respect to the subcarrier spacing of the CORESET from the smallest RB index of the CORESET for an RMSI search space to the smallest RB index of the common RB overlapping with the first RB of the SS/PBCH block 420.

For pattern 405-a, a UE 115 may monitor PDCCH in the RMSI search space CORESET 425 over two consecutive slots starting from a slot, $n_0$, where $n_0 = (O \cdot 2^\mu + \lfloor i \cdot M \rfloor) \bmod N_{slot}^{frame,\mu}$ located in a frame with $SFN_C$ satisfying $SFN_C \bmod 2 = 0$ if $$\left[ \frac{O \cdot 2^\mu + \lfloor i \cdot M \rfloor}{N_{slot}^{frame,\mu}} \right] \bmod 2 = 0$$

or in a frame with SFN satisfying $SFN_C \bmod 2 = 1$ if $$\left[ \frac{O \cdot 2^\mu + \lfloor i \cdot M \rfloor}{N_{slot}^{frame,\mu}} \right] \bmod 2 = 1.$$

Values for M and O may be found in Tables 1 and 2, and $\mu \in \{0,1,2,3\}$ based on the subcarrier spacing for PDCCH receptions in the CORESET. The index for the first symbol of the CORESET in slot $n_C$ may be the first symbol index provided Tables 1 and 2.

For patterns 405-b and 405-c, a UE 115 may monitor PDCCH in the RMSI search space over one slot with RMSI search space periodicity equal to the periodicity of the corresponding SS/PBCH block 420. For an SS/PBCH block 420 with index i, the UE 115 may determine the slot index $n_C$ and $SFN_C$ based on the parameters provided in tables 3 through 5.

If a UE 115 detects a first SS/PBCH block 420 and determines that a CORESET 425 for an RMSI search space is not present, and for certain frequency ranges (FRs) (e.g., $24 \leq k_{SSB} \leq 29$ for FR1 or for $12 \leq k_{SSB} \leq 13$ for FR2), the UE 115 may determine the global synchronization channel number (GSCN) of a second SS/PBCH block 420 having a CORESET for an associated RMSI search space as $N_{GSCN}^{Reference} + N_{GSCN}^{Offset}$, where $N_{GSCN}^{Reference}$ is the GSCN of the first SS/PBCH block 420 and $N_{GSCN}^{offset}$ is the GSCN offset is provided by Tables 6 and 7 presented below, where Table 6 corresponds to FR1 (e.g., 450 MHz to 6000 MHz) and Table 7 corresponds to FR2 (e.g., 24250 MHz to 52600 MHZ).

If a UE 115 detects an SS/PBCH block 420 and determines that a CORESET for the RMSI search space is not present, for certain FRs (e.g., $k_{SSB}=31$ for FR1 or $k_{SSB}=15$ for FR2), the UE 115 may determine that there is no SS/PBCH block having an associated RMSI search space within a GSCN range $[N_{GSCN}^{Reference}-N_{GSCN}^{Start}, N_{GSCN}^{Reference}+N_{GSCN}^{End}]$, where $N_{GSCN}^{Start}$ and $N_{GSCN}^{End}$ are determined based on a first set of bits (e.g., four most significant bits) and a second set of bits (e.g., four least significant bits) of an RMSI PDCCH configuration, respectively.

TABLE 6

Mapping between the combination of $k_{SSB}$ and RMSI PDCCH Configuration to $N_{GSCN}^{Offset}$ for FR1

| $k_{SSB}$ | RMSI-PDCCH-Config | $N_{GSCN}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

TABLE 7

Mapping between the combination of $k_{SSB}$ and RMSI PDCCH Configuration to $N_{GSCN}^{Offset}$ for FR2

| $k_{SSB}$ | RMSI-PDCCH-Config | $N_{GSCN}^{Offset}$ |
|---|---|---|
| 12 | 0, 1, . . . , 255 | 1, 2, . . . , 256 |
| 13 | 0, 1, . . . , 255 | −1, −2, . . . , −256 |
| 14 | 0, 1, . . . , 255 | Reserved, Reserved, . . . , Reserved |

Figure 5:
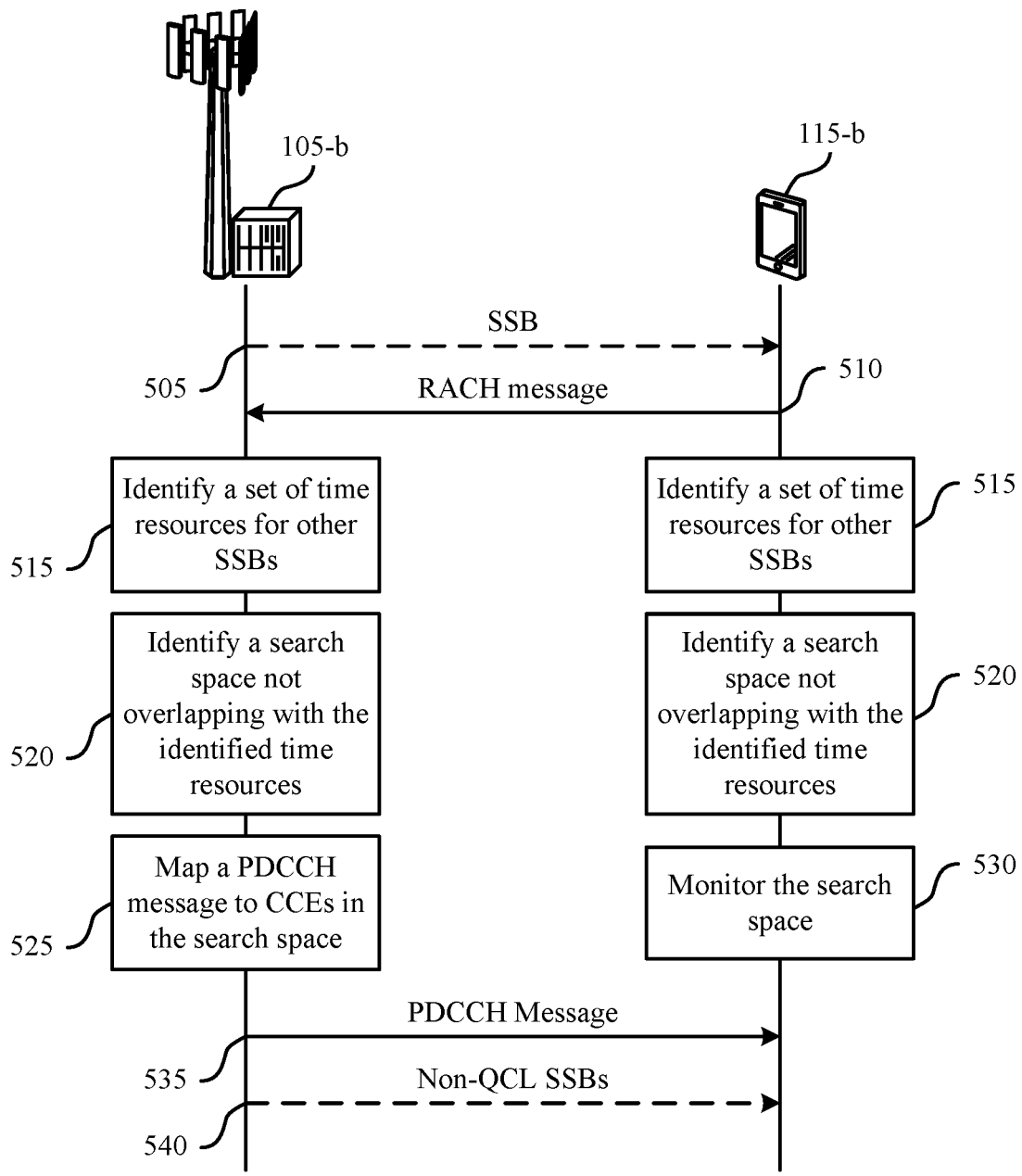
FIG. 5 illustrates an example of a process flow that supports search space configurations for RACH messaging in accordance with aspects of the present disclosure.

FIG. 5 illustrates an example of a process flow 500 that supports search space configurations for RACH messaging in accordance with aspects of the present disclosure. Process flow 500 may include base station 105-*b* and UE 115-*b*, which may be examples of the devices described with respect to FIGS. 1 and 2. UE 115-*b* may determine a search space for receiving downlink RACH messaging (e.g., PDCCH signals) based on SSB transmission timing. In some implementations, the processes described herein may be performed in a different order, or may include one or more additional or alternative processes performed by the wireless devices.

At 505, base station 105-*b* may transmit a set of SSBs. UE 115-*b* may receive the set of SSBs, and may select one SSB of the set of SSBs. In some cases, UE 115-*b* may receive different SSBs on different receive beams based on whether or not the SSB transmissions are QCL. For example, UE 115-*b* may receive the SSB on a first receive beam, and may receive one or more other SSBs of the set of SSBs on receive beams different from the first receive beam. At 510, UE 115-*b* may transmit, to base station 105-*b*, a first RACH message based on the selected SSB. For example, UE 115-*b* may transmit the first RACH message in a RACH occasion corresponding to the selected SSB.

At 515, UE 115-*b* and base station 105-*b* may identify a set of time resources used by base station 105-*b* for transmission of the one or more other SSBs. These other SSBs may be received by UE 115-*b* on receive beams that are different from the first receive beams. The identified set of time resources may correspond to the time resources used for SSBs that cannot be received by UE 115-*b* on a same beam as the selected SSB.

At 520, UE 115-*b* and base station 105-*b* may identify a search space for receiving a PDCCH message based on the first RACH message, where the identified search space includes time resources that are different from the identified set of time resources. For example, the search space may not include any time resources overlapping the identified set of time resources. In some cases, the search space may be an example of a modified RMSI search space indicated via a PBCH configuration, where the RMSI search space is modified to remove resource overlapping in time with the identified set of time resources. In other cases, the search space may be an example of a valid RMSI search space (e.g., not indicated via a PBCH configuration) that does not overlap with the identified set of time resources. For example, the search space may use a pattern where the PDCCH CORESET is not TDM with synchronization signals. In yet other cases, UE 115-*b* may receive a configuration for the search space, and may remove time resources from the configured search space that overlap with the identified set of time resources. In any of these cases, the resulting search space used to monitor for transmissions may not overlap in time with non-QCL SSB transmissions.

At 525, base station 105-*b* may map the PDCCH message to CCEs within the identified search space. This PDCCH message may be an example of a PDCCH grant for a RACH Msg 2/3/4. At 530, UE 115-*b* may monitor the search space for the PDCCH message transmission. UE 115-*b* may monitor for the transmission using the first receive beam (e.g., the receive beam used to receive the selected SSB).

At 535, base station 105-*b* may transmit the PDCCH message to UE 115-*b* according to the mapping. In some cases, base station 105-*b* may transmit the set of SSBs again at 540. UE 115-*b* may receive the non-QCL SSBs based on switching receive beams. For example, UE 115-*b* may receive transmissions using the first receive beam during time resources of the search space, and may receive transmissions using different receive beams during the identified set of time resources for the non-QCL SSBs. If UE 115-*b* receives the PDCCH message (e.g., in response to the first RACH message, during a reception window), UE 115-*b* may perform further RACH procedures. If UE 115-*b* does not receive the PDCCH message, UE 115-*b* may perform a retransmission process (e.g., using the same SSB, or using an additional received SSB, such as one of the non-QCL SSBs).

Figure 6:
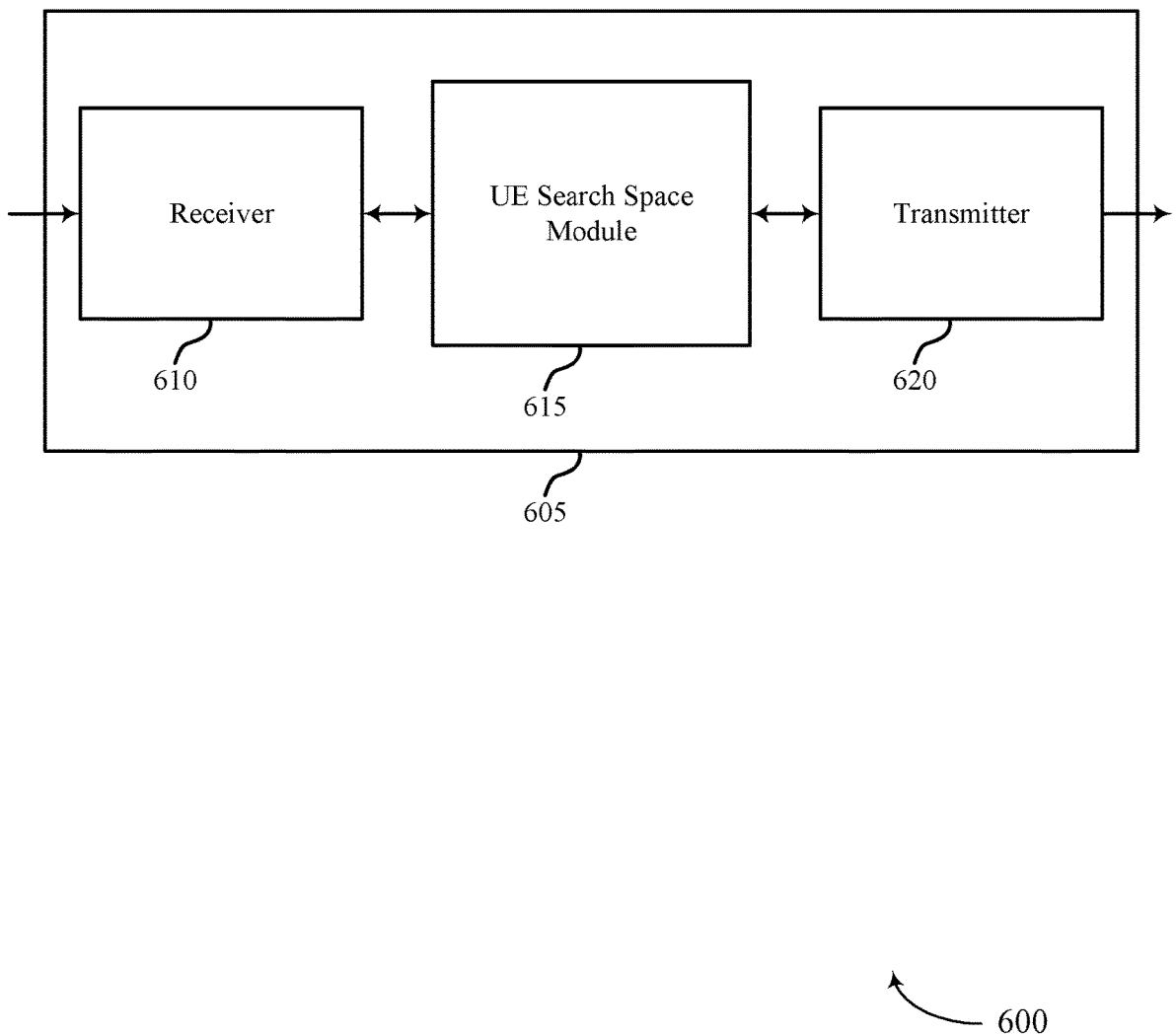
FIGS. 6 through 8 show block diagrams of a device that supports search space configurations for RACH messaging in accordance with aspects of the present disclosure.

FIG. 6 shows a block diagram 600 of a wireless device 605 that supports search space configurations for RACH messaging in accordance with aspects of the present disclosure. Wireless device 605 may be an example of aspects of UE 115 as described herein. Wireless device 605 may include receiver 610, UE search space module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to search space configurations for RACH messaging, etc.). Information may be passed on to other components of the device. The receiver 610 may be an example of aspects of the transceiver 935 described with reference to FIG. 9. The receiver 610 may utilize a single antenna or a set of antennas.

UE search space module 615 may be an example of aspects of the UE search space module 915 described with reference to FIG. 9.

UE search space module 615 and/or at least some of its various sub-components may be implemented in hardware, software executed by a processor, firmware, or any combination thereof. If implemented in software executed by a processor, the functions of the UE search space module 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE search space module 615 and/or at least some of its various sub-components may be physically located at various positions, including being distributed such that portions of functions are implemented at different physical locations by one or more physical devices. In some examples, UE search space module 615 and/or at least some of its various sub-components may be a separate and distinct component in accordance with various aspects of the present disclosure. In other examples, UE search space module 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE search space module 615 may transmit, to a base station, a first RACH message based on an SSB received by the UE on a first receive beam, identify a set of time resources used by the base station for transmission of one or more other SSBs from the base station, identify a search space for receiving a PDCCH message based on the first RACH message, where the identified search space includes time resources that are different from the identified set of time resources, and monitor for the PDCCH message in the identified search space.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
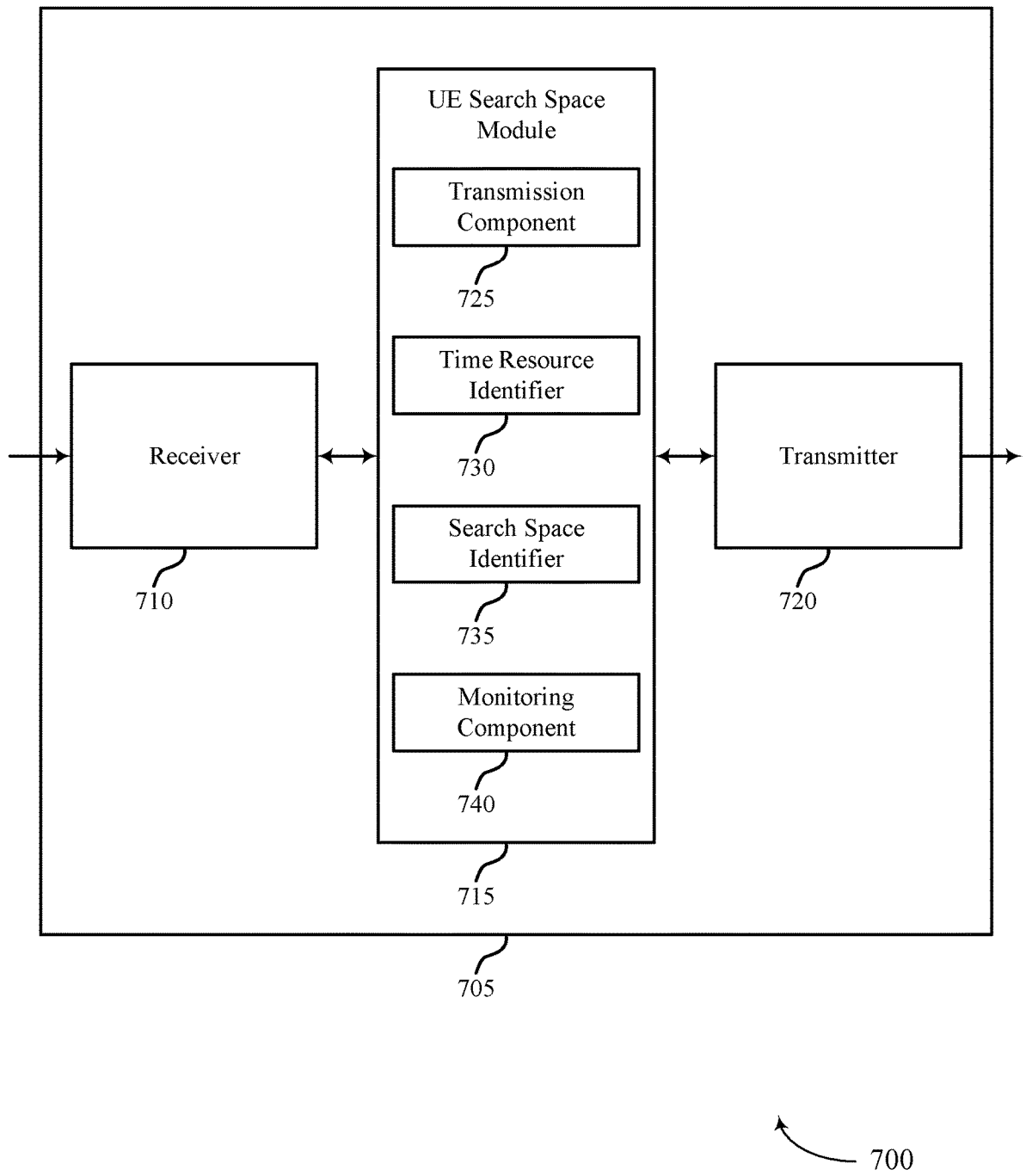

FIG. 7 shows a block diagram 700 of a wireless device 705 that supports search space configurations for RACH messaging in accordance with aspects of the present disclosure. Wireless device 705 may be an example of aspects of a wireless device 605 or a UE 115 as described with reference to FIG. 6. Wireless device 705 may include receiver 710, UE search space module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to search space configurations for RACH messaging, etc.). Information may be passed on to other components of the device. The receiver 710 may be an example of aspects of the transceiver 935 described with reference to FIG. 9. The receiver 710 may utilize a single antenna or a set of antennas.

UE search space module 715 may be an example of aspects of the UE search space module 915 described with reference to FIG. 9. UE search space module 715 may also include transmission component 725, time resource identifier 730, search space identifier 735, and monitoring component 740.

Transmission component 725 may transmit, to a base station, a first RACH message based on an SSB received by the UE on a first receive beam. Time resource identifier 730 may identify a set of time resources used by the base station for transmission of one or more other SSBs from the base station. Search space identifier 735 may identify a search space for receiving a PDCCH message based on the first RACH message, where the identified search space includes time resources that are different from the identified set of time resources. Monitoring component 740 may monitor for the PDCCH message in the identified search space.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
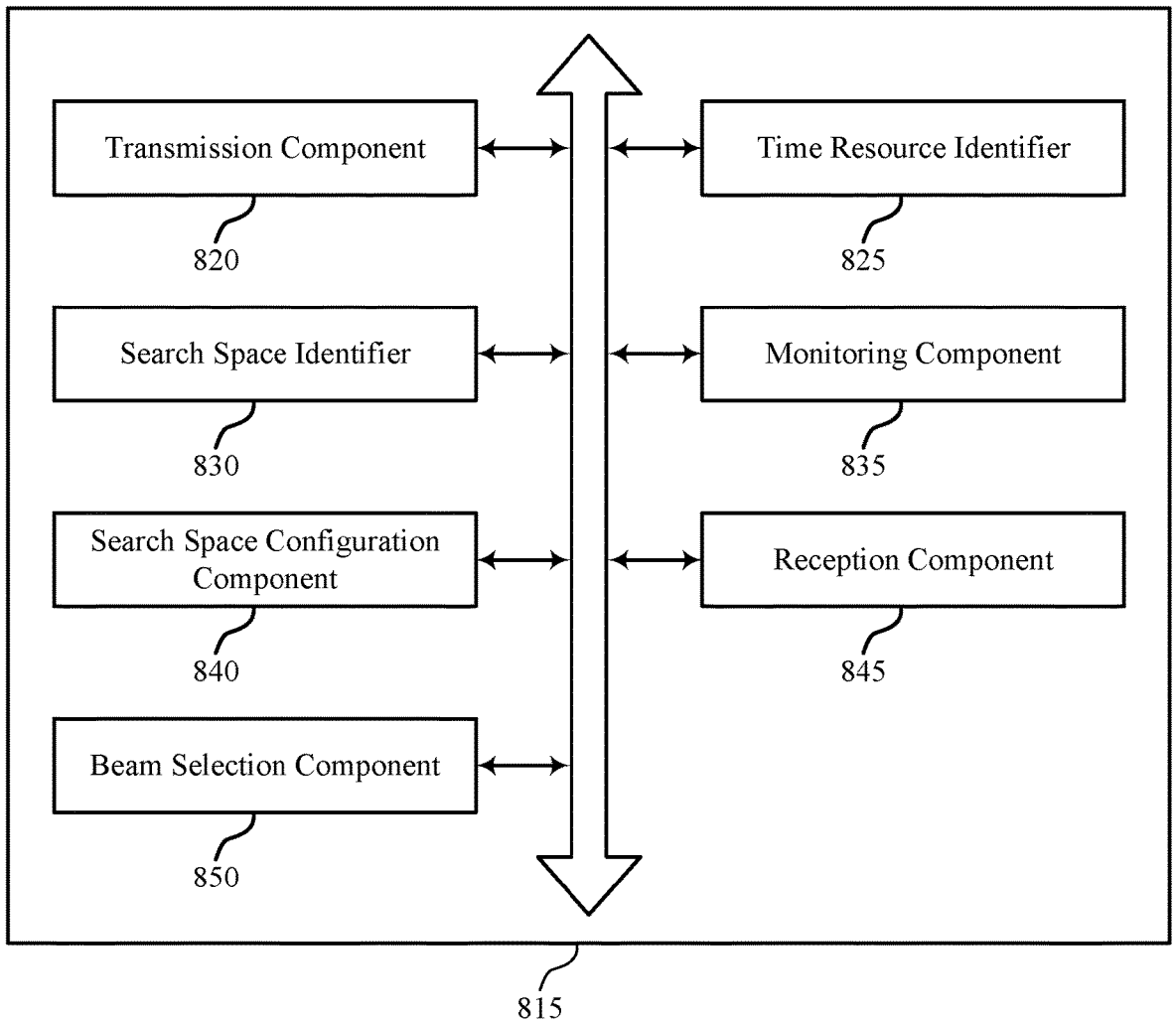

FIG. 8 shows a block diagram 800 of a UE search space module 815 that supports search space configurations for RACH messaging in accordance with aspects of the present disclosure. The UE search space module 815 may be an example of aspects of a UE search space module 615, a UE search space module 715, or a UE search space module 915 described with reference to FIGS. 6, 7, and 9. The UE search space module 815 may include transmission component 820, time resource identifier 825, search space identifier 830, monitoring component 835, search space configuration component 840, reception component 845, and beam selection component 850. Each of these modules may communicate, directly or indirectly, with one another (e.g., via one or more buses).

Transmission component 820 may transmit, to a base station, a first RACH message based on an SSB received by a UE 115 on a first receive beam.

Time resource identifier 825 may identify a set of time resources used by the base station for transmission of one or more other SSBs from the base station. In some cases, the one or more other SSBs are received by a UE 115 on receive beams that are different from the first receive beam. In some cases, the one or more other SSBs are examples of one or more SSBs actually transmitted by the base station. In some cases, time resource identifier 825 may receive, from the base station, an indication of the one or more SSBs actually transmitted by the base station in RMSI, other system information (OSI), an RRC message, a MAC CE, a handover message, or a combination thereof. In some cases, locations of the one or more other SSBs are fixed.

Search space identifier 830 may identify a search space for receiving a PDCCH message based on the first RACH message, where the identified search space includes time resources that are different from the identified set of time resources. In some cases, search space identifier 830 may identify an RMSI search space corresponding to the SSB and configured via a PBCH configuration, where identifying the search space may further include removing time resources from the identified RMSI search space that overlap with the identified set of time resources, where the identified search space includes remaining time resources of the identified RMSI search space. In some cases, removing the time resources from the identified RMSI search space includes altering a slot-level periodicity of the identified RMSI search space, where the identified search space includes same symbol index locations as the identified RMSI search space but with the altered slot-level periodicity of the identified RMSI search space. In some cases, identifying the search space may further include determining to implement a default search space based on an RMSI transmission from the base station, and identifying monitoring occasions for monitoring for the PDCCH message based on monitoring occasions of the RMSI search space. In some cases, identifying the search space may further include identifying an RMSI search space with time resources non-overlapping with the identified set of time resources, where the identified search space includes the identified RMSI search space. In some cases, identifying the search space may further include identifying a start of the search space based on transmitting the first RACH message, and identifying an end of the search space based on a response timer. In some cases, the response timer includes a RAR window, a contention resolution timer, or a combination thereof.

Monitoring component 835 may monitor for the PDCCH message in the identified search space. In some cases, beam selection component 850 may select the first receive beam, where the identified search space is monitored using the selected first receive beam during the time resources that are different from the identified set of time resources. In some cases, beam selection component 850 may additionally select a second receive beam different from the selected first receive beam. Monitoring component 835 may monitor for at least one SSB of the one or more other SSBs using the selected second receive beam during the identified set of time resources. In some cases, the PDCCH message is an example of a PDCCH grant for a RACH Msg2 transmission, a PDCCH grant for a RACH Msg3 transmission, a PDCCH grant for a RACH Msg4 transmission, or a combination thereof.

Search space configuration component 840 may receive, from the base station, an indication of a set of time resources for the search space, and may remove time resources of the identified set of time resources from the indicated set of time resources for the search space, where the identified search space includes remaining time resources of the indicated set of time resources for the search space. In some cases, the indication of the set of time resources for the search space includes a time window for the search space. In some cases, a subset of slots of the time window include the identified search space. In some cases, the subset of slots includes each slot of the time window.

In some cases, reception component 845 may receive the SSB from the base station, where the first RACH message is transmitted in a RACH occasion corresponding to the SSB. Additionally or alternatively, reception component 845 may receive the at least one SSB of the one or more other SSBs from the base station based on the time resources for the identified search space not overlapping with the identified set of time resources. In some cases, reception component 845 may receive the PDCCH message in CCEs of the identified search space based on the monitoring.

Figure 9:
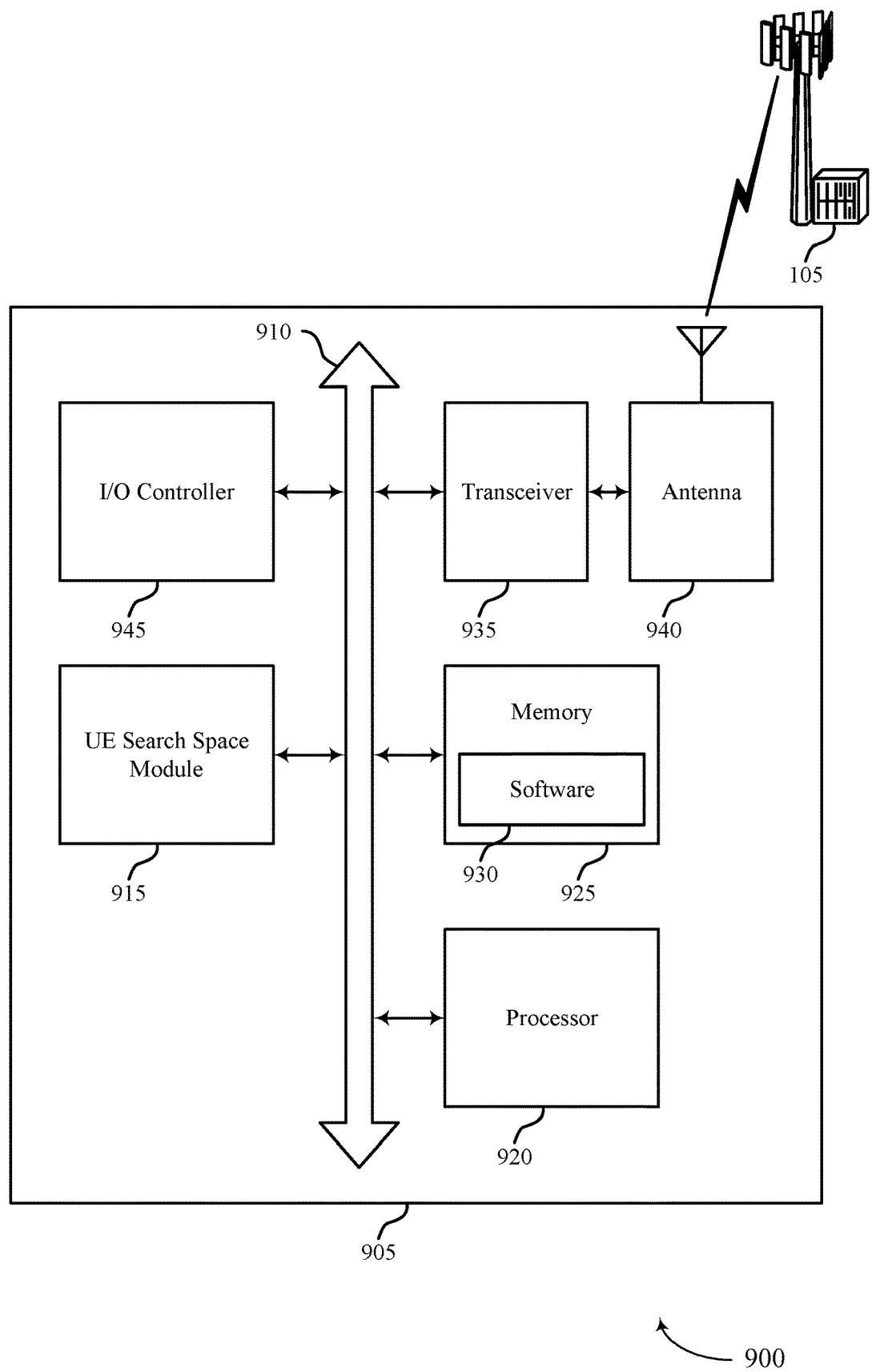
FIG. 9 illustrates a block diagram of a system including a user equipment (UE) that supports search space configurations for RACH messaging in accordance with aspects of the present disclosure.

FIG. 9 illustrates a block diagram of a system 900 including a device 905 that supports search space configurations for RACH messaging in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE search space module 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting search space configurations for RACH messaging).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic I/O system (BIOS) which may control basic hardware or software operation such as the interaction with peripheral components or devices.

Software 930 may include code to implement aspects of the present disclosure, including code to support search space configurations for RACH messaging. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
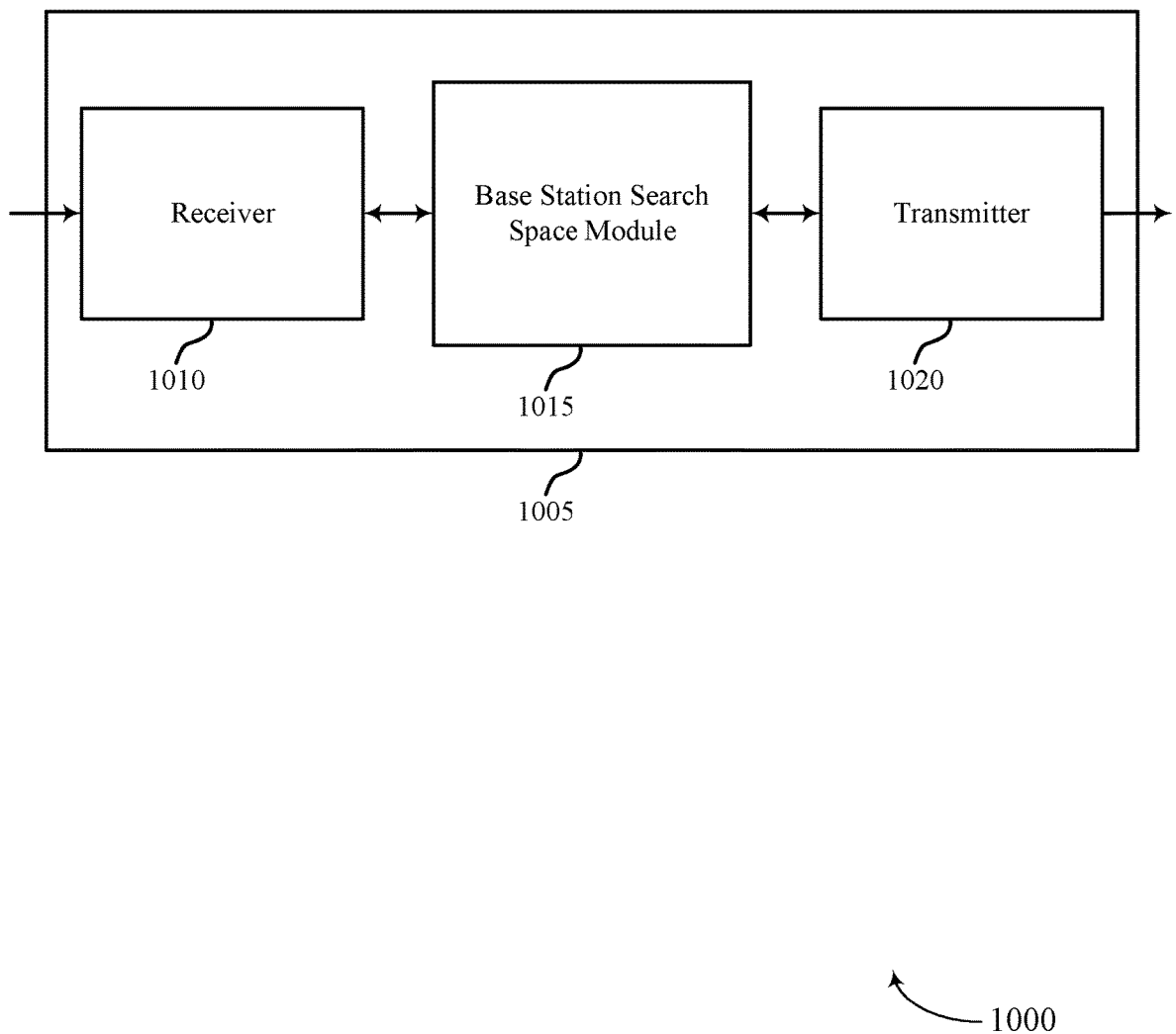
FIGS. 10 through 12 show block diagrams of a device that supports search space configurations for RACH messaging in accordance with aspects of the present disclosure.

FIG. 10 shows a block diagram 1000 of a wireless device 1005 that supports search space configurations for RACH messaging in accordance with aspects of the present disclosure. Wireless device 1005 may be an example of aspects of a base station 105 as described herein. Wireless device 1005 may include receiver 1010, base station search space module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to search space configurations for RACH messaging, etc.). Information may be passed on to other components of the device. The receiver 1010 may be an example of aspects of the transceiver 1335 described with reference to FIG. 13. The receiver 1010 may utilize a single antenna or a set of antennas.

Base station search space module 1015 may be an example of aspects of the base station search space module 1315 described with reference to FIG. 13.

Base station search space module 1015 and/or at least some of its various sub-components may be implemented in hardware, software executed by a processor, firmware, or any combination thereof. If implemented in software executed by a processor, the functions of the base station search space module 1015 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure. The base station search space module 1015 and/or at least some of its various sub-components may be physically located at various positions, including being distributed such that portions of functions are implemented at different physical locations by one or more physical devices. In some examples, base station search space module 1015 and/or at least some of its various sub-components may be a separate and distinct component in accordance with various aspects of the present disclosure. In other examples, base station search space module 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station search space module 1015 may receive, from a UE 115, a first RACH message based on an SSB received by the UE 115 on a first receive beam, identify a set of time resources used for transmission of one or more other SSBs by the base station, and identify a search space for the UE 115 to receive a PDCCH message based on the first RACH message, where the identified search space includes time resources that are different from the identified set of time resources. Base station search space module 1015 may additionally map the PDCCH message to CCEs within the identified search space, and transmit, to the UE, the PDCCH message according to the mapping.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
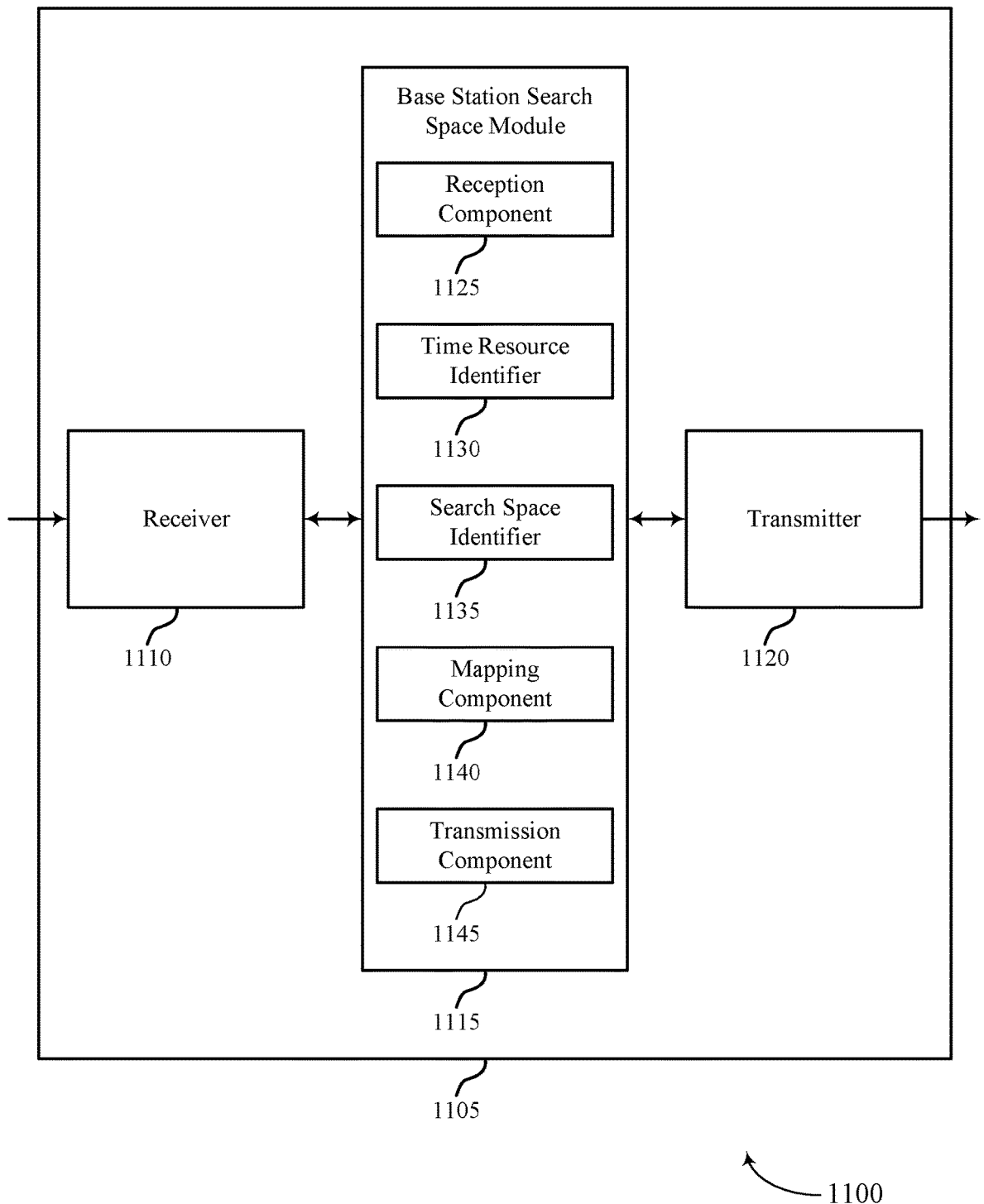

FIG. 11 shows a block diagram 1100 of a wireless device 1105 that supports search space configurations for RACH messaging in accordance with aspects of the present disclosure. Wireless device 1105 may be an example of aspects of a wireless device 1005 or a base station 105 as described with reference to FIG. 10. Wireless device 1105 may include receiver 1110, base station search space module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to search space configurations for RACH messaging, etc.). Information may be passed on to other components of the device. The receiver 1110 may be an example of aspects of the transceiver 1335 described with reference to FIG. 13. The receiver 1110 may utilize a single antenna or a set of antennas.

Base station search space module 1115 may be an example of aspects of the base station search space module 1315 described with reference to FIG. 13. Base station search space module 1115 may also include reception component 1125, time resource identifier 1130, search space identifier 1135, mapping component 1140, and transmission component 1145.

Reception component 1125 may receive, from a UE, a first RACH message based on an SSB received by a UE 115 on a first receive beam. Time resource identifier 1130 may identify a set of time resources used for transmission of one or more other SSBs by the base station. In some cases, the one or more other SSBs are received by the UE 115 on receive beams that are different from the first receive beam. Search space identifier 1135 may identify a search space for the UE 115 to receive a PDCCH message based on the first RACH message, where the identified search space includes time resources that are different from the identified set of time resources. Mapping component 1140 may map the PDCCH message to CCEs within the identified search space. Transmission component 1145 may transmit, to the UE, the PDCCH message according to the mapping.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
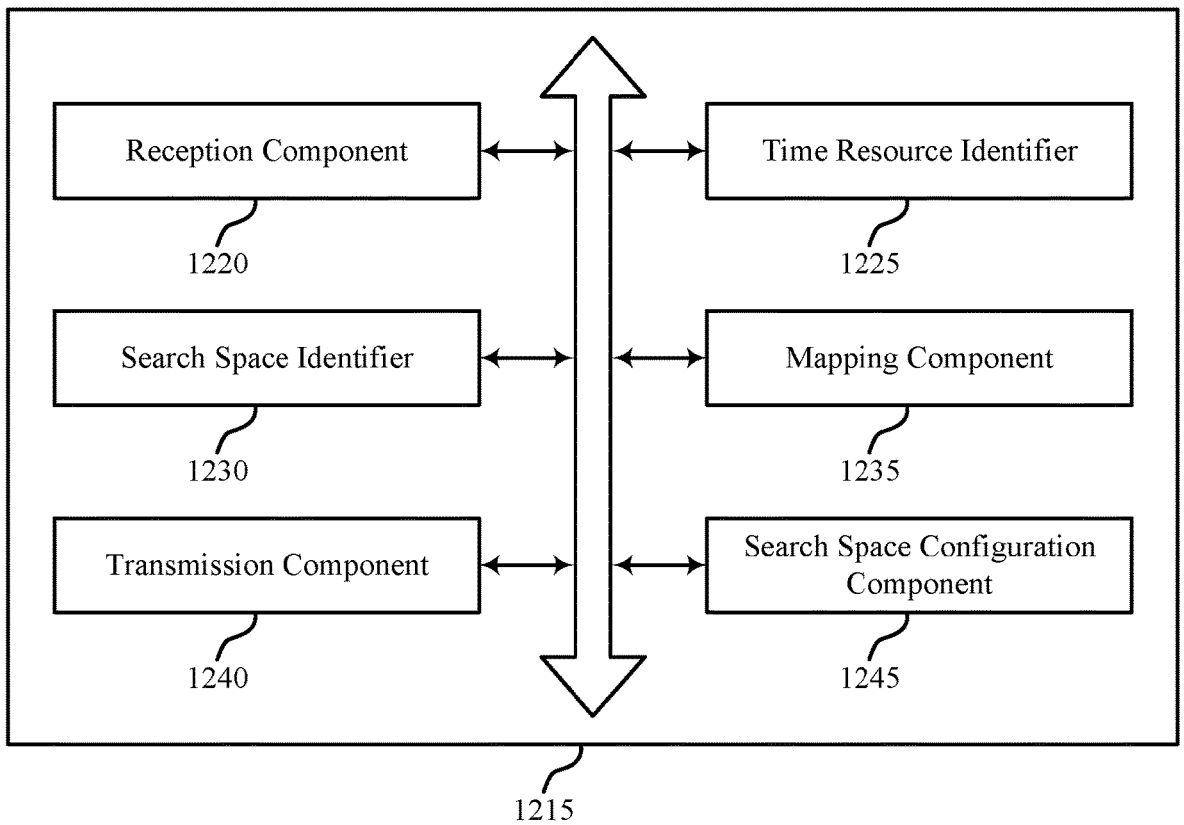

FIG. 12 shows a block diagram 1200 of a base station search space module 1215 that supports search space configurations for RACH messaging in accordance with aspects of the present disclosure. The base station search space module 1215 may be an example of aspects of a base station search space module 1315 described with reference to FIGS. 10, 11, and 13. The base station search space module 1215 may include reception component 1220, time resource identifier 1225, search space identifier 1230, mapping component 1235, transmission component 1240, and search space configuration component 1245. Each of these modules may communicate, directly or indirectly, with one another (e.g., via one or more buses).

Reception component 1220 may receive, from a UE, a first RACH message based on an SSB received by the UE 115 on a first receive beam.

Time resource identifier 1225 may identify a set of time resources used for transmission of one or more other SSBs by the base station. In some cases, the one or more other SSBs are received by a UE 115 on receive beams that are different from the first receive beam.

Search space identifier 1230 may identify a search space for a UE 115 to receive a PDCCH message based on the first RACH message, where the identified search space includes time resources that are different from the identified set of time resources. In some cases, search space identifier 1230 may identify an RMSI search space corresponding to the SSB and configured via a PBCH configuration. In some cases, identifying the search space further includes removing time resources from the identified RMSI search space that overlap with the identified set of time resources, where the identified search space includes remaining time resources of the identified RMSI search space. In some cases, removing the time resources for the identified RMSI search space includes altering a slot-level periodicity of the identified RMSI search space, where the identified search space includes same symbol index locations as the identified RMSI search space but with the altered slot-level periodicity of the identified RMSI search space. In other cases, identifying the search space further includes identifying an RMSI search space with time resources non-overlapping with the identified set of time resources, where the identified search space includes the identified RMSI search space.

Mapping component 1235 may map the PDCCH message to CCEs within the identified search space.

Transmission component 1240 may transmit, to the UE, the PDCCH message according to the mapping. In some cases, transmission component 1240 may transmit, to the UE, the SSB, where the first RACH message is received in a RACH occasion corresponding to the SSB. In some cases, the PDCCH message is an example of a PDCCH grant for a RACH Msg2 transmission, a PDCCH grant for a RACH Msg3 transmission, a PDCCH grant for a RACH Msg4 transmission, or a combination thereof.

Search space configuration component 1245 may transmit, to the UE, an indication of a set of time resources for the search space, and may remove time resources of the identified set of time resources from the indicated set of time resources for the search space, where the identified search space includes remaining time resources of the indicated set of time resources for the search space. In some cases, the indication of the set of time resources for the search space includes a time window for the search space. In some cases, a subset of slots of the time window include the identified search space. In some cases, the subset of slots includes each slot of the time window.

Figure 13:
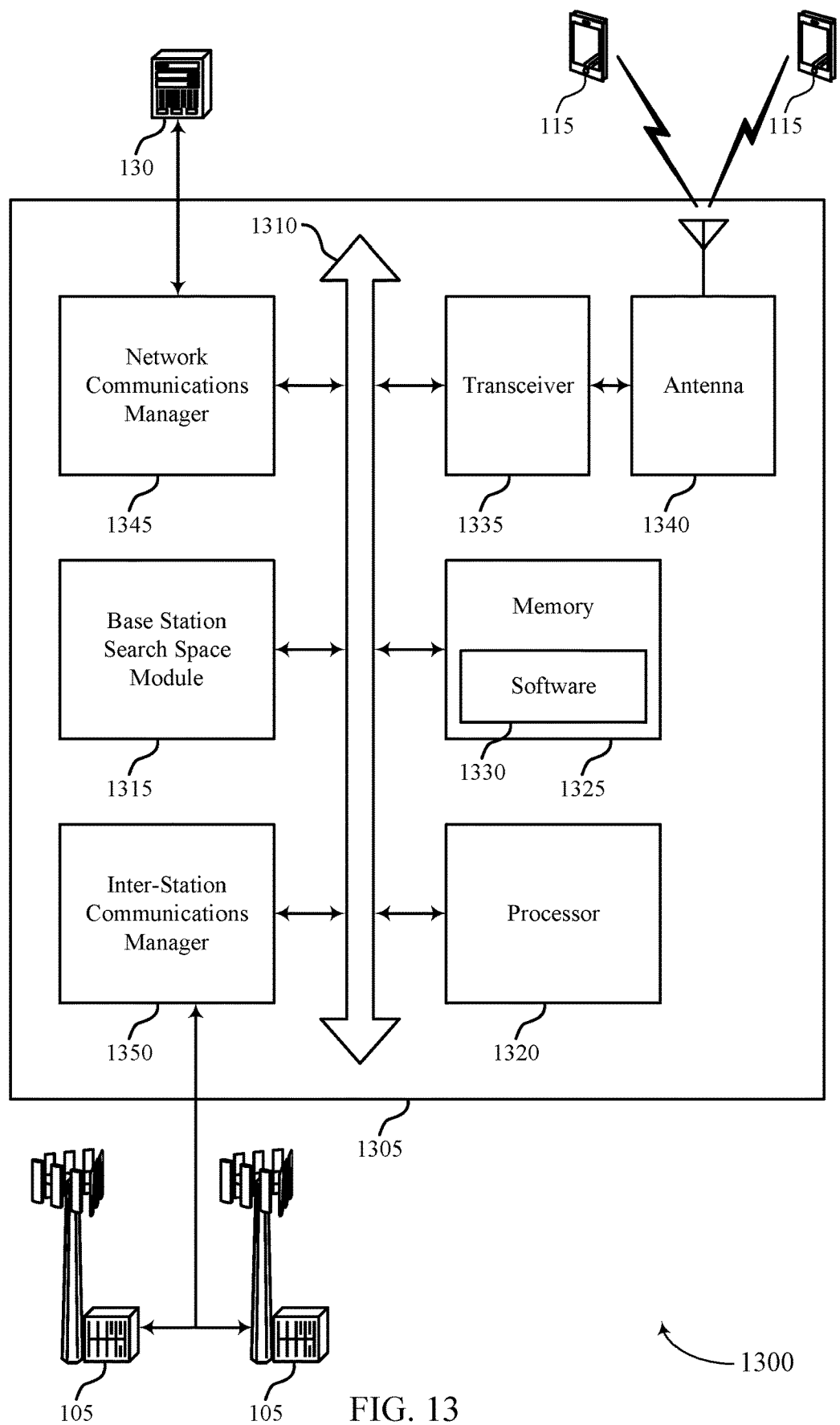
FIG. 13 illustrates a block diagram of a system including a base station that supports search space configurations for RACH messaging in accordance with aspects of the present disclosure.

FIG. 13 illustrates a block diagram of a system 1300 including a device 1305 that supports search space configurations for RACH messaging in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station search space module 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device (e.g., a general-purpose processor, a DSP, a CPU, a microcontroller, an ASIC, an FPGA, a PLD, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting search space configurations for RACH messaging).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support search space configurations for RACH messaging. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network 130 (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
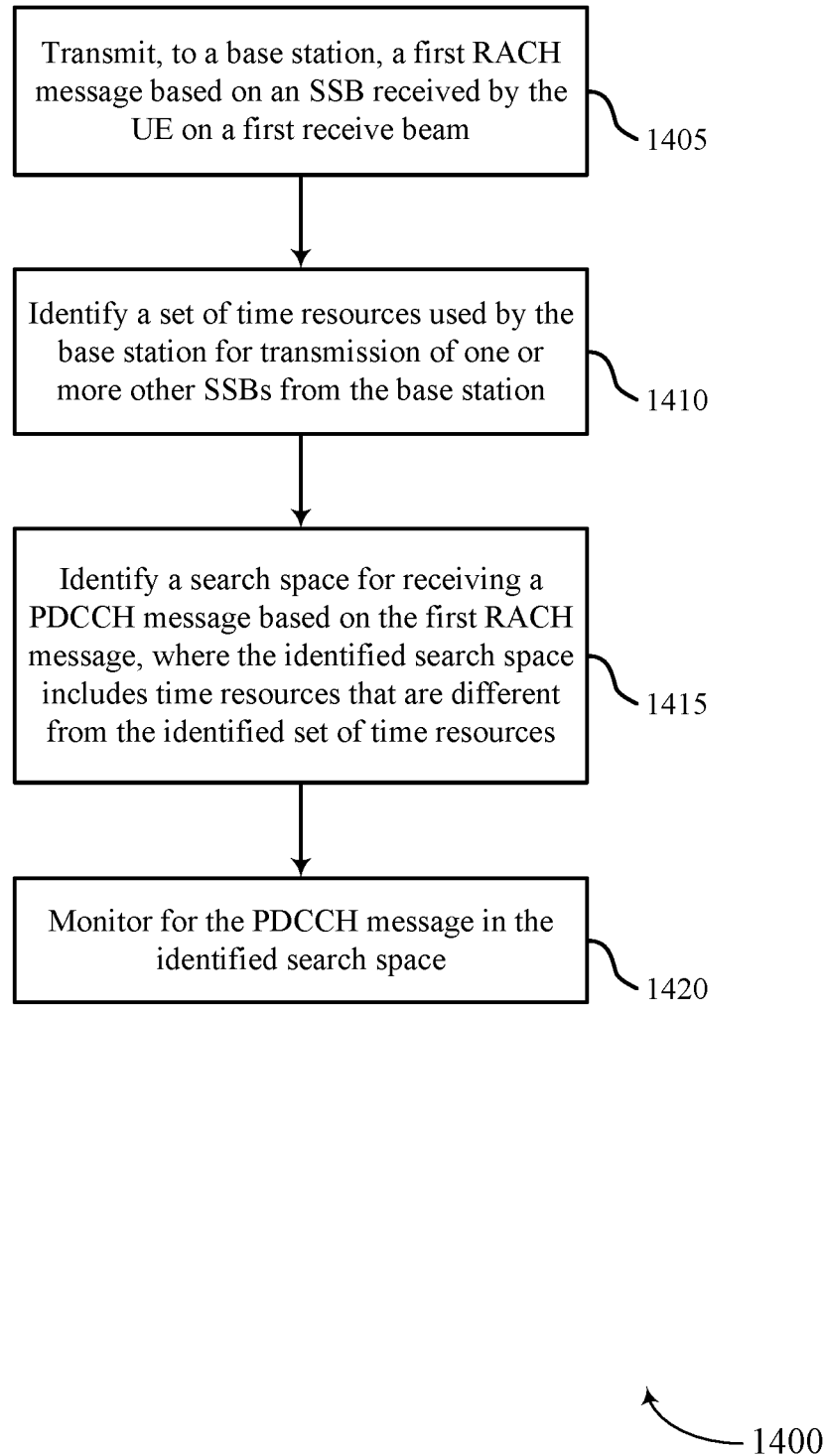
FIGS. 14 through 16 show flowcharts illustrating methods for search space configurations for RACH messaging in accordance with aspects of the present disclosure.

FIG. 14 shows a flowchart illustrating a method 1400 for search space configurations for RACH messaging in accordance with aspects of the present disclosure. The operations of method 1400 may be implemented by a UE 115 or its components as described herein. For example, the operations of method 1400 may be performed by a UE search space module as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may transmit, to a base station, a first RACH message based on an SSB received by the UE 115 on a first receive beam. The operations of 1405 may be performed according to the methods described herein. In certain examples, aspects of the operations of 1405 may be performed by a transmission component as described with reference to FIGS. 6 through 9.

At 1410 the UE 115 may identify a set of time resources used by the base station for transmission of one or more other SSBs from the base station. The operations of 1410 may be performed according to the methods described herein. In certain examples, aspects of the operations of 1410 may be performed by a time resource identifier as described with reference to FIGS. 6 through 9.

At 1415 the UE 115 may identify a search space for receiving a PDCCH message based on the first RACH message, where the identified search space includes time resources that are different from the identified set of time resources. The operations of 1415 may be performed according to the methods described herein. In certain examples, aspects of the operations of 1415 may be performed by a search space identifier as described with reference to FIGS. 6 through 9.

At 1420 the UE 115 may monitor for the PDCCH message in the identified search space. The operations of 1420 may be performed according to the methods described herein. In certain examples, aspects of the operations of 1420 may be performed by a monitoring component as described with reference to FIGS. 6 through 9.

Figure 15:
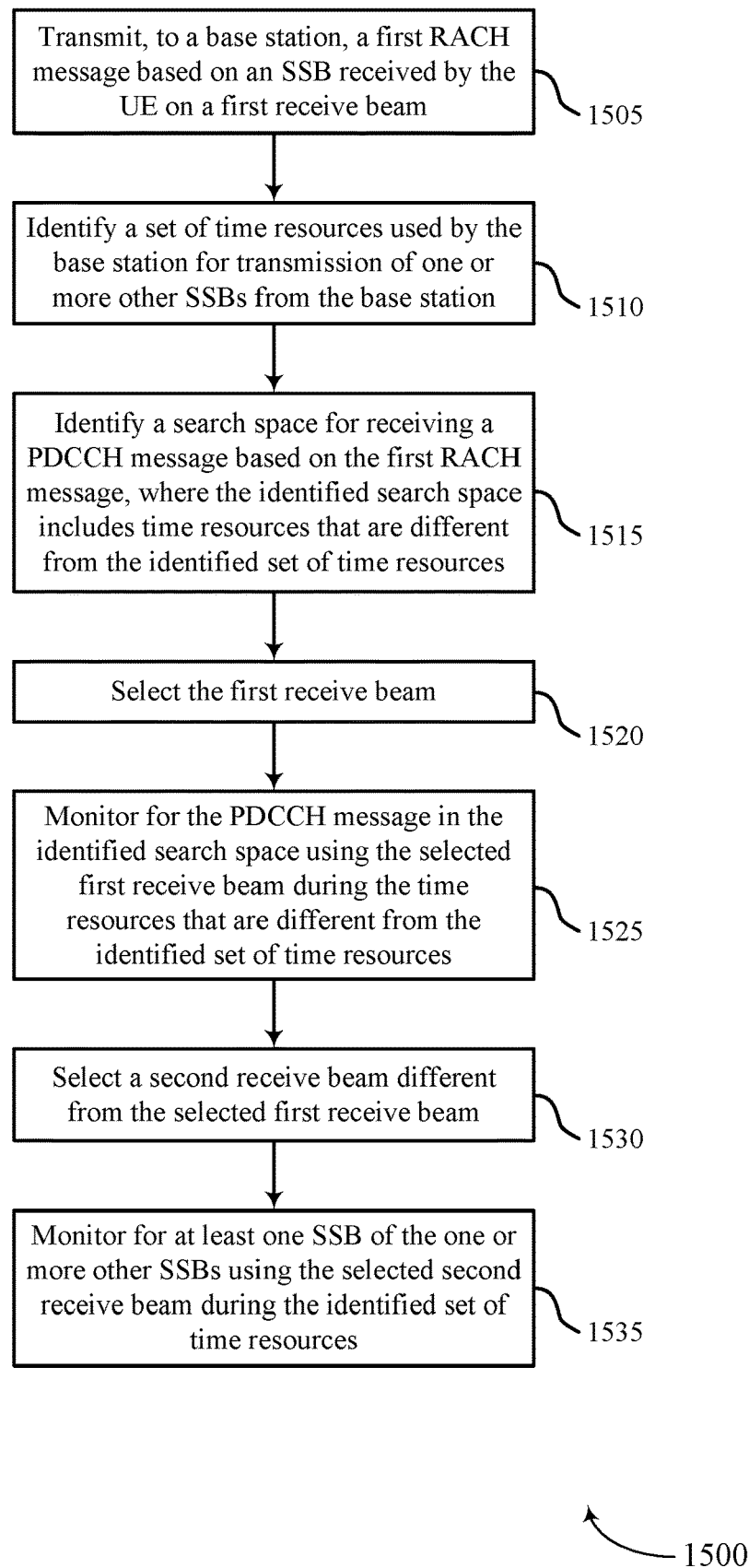

FIG. 15 shows a flowchart illustrating a method 1500 for search space configurations for RACH messaging in accordance with aspects of the present disclosure. The operations of method 1500 may be implemented by a UE 115 or its components as described herein. For example, the operations of method 1500 may be performed by a UE search space module as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may transmit, to a base station, a first RACH message based on an SSB received by the UE 115 on a first receive beam. The operations of 1505 may be performed according to the methods described herein. In certain examples, aspects of the operations of 1505 may be performed by a transmission component as described with reference to FIGS. 6 through 9.

At 1510 the UE 115 may identify a set of time resources used by the base station for transmission of one or more other SSBs from the base station. The operations of 1510 may be performed according to the methods described herein. In certain examples, aspects of the operations of 1510 may be performed by a time resource identifier as described with reference to FIGS. 6 through 9.

At 1515 the UE 115 may identify a search space for receiving a PDCCH message based on the first RACH message, where the identified search space includes time resources that are different from the identified set of time resources. The operations of 1515 may be performed according to the methods described herein. In certain examples, aspects of the operations of 1515 may be performed by a search space identifier as described with reference to FIGS. 6 through 9.

At 1520 the UE 115 may select the first receive beam. The operations of 1520 may be performed according to the methods described herein. In certain examples, aspects of the operations of 1520 may be performed by a beam selection component as described with reference to FIGS. 6 through 9.

At 1525 the UE 115 may monitor for the PDCCH message in the identified search space, where the identified search space is monitored using the selected first receive beam during the time resources that are different from the identified set of time resources. The operations of 1525 may be performed according to the methods described herein. In certain examples, aspects of the operations of 1525 may be performed by a monitoring component as described with reference to FIGS. 6 through 9.

At 1530 the UE 115 may select a second receive beam different from the selected first receive beam. The operations of 1530 may be performed according to the methods described herein. In certain examples, aspects of the operations of 1530 may be performed by a beam selection component as described with reference to FIGS. 6 through 9.

At 1535 the UE 115 may monitor for at least one SSB of the one or more other SSBs using the selected second receive beam during the identified set of time resources. The operations of 1535 may be performed according to the methods described herein. In certain examples, aspects of the operations of 1535 may be performed by a monitoring component as described with reference to FIGS. 6 through 9.

Figure 16:
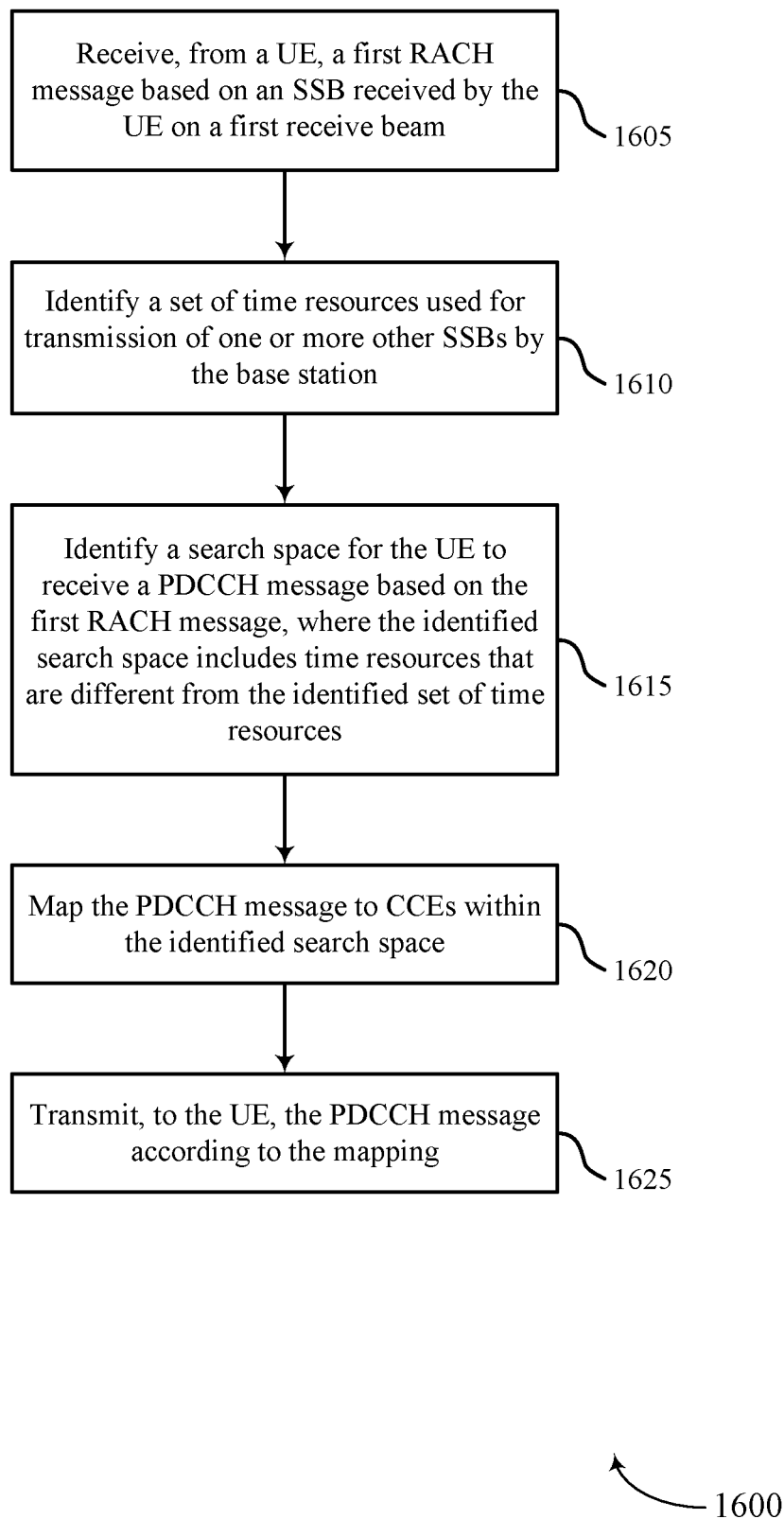

FIG. 16 shows a flowchart illustrating a method 1600 for search space configurations for RACH messaging in accordance with aspects of the present disclosure. The operations of method 1600 may be implemented by a base station 105 or its components as described herein. For example, the operations of method 1600 may be performed by a base station search space module as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may receive, from a UE 115, a first RACH message based on an SSB received by the UE 115 on a first receive beam. The operations of 1605 may be performed according to the methods described herein. In certain examples, aspects of the operations of 1605 may be performed by a reception component as described with reference to FIGS. 10 through 13.

At 1610 the base station 105 may identify a set of time resources used for transmission of one or more other SSBs by the base station 105. The operations of 1610 may be performed according to the methods described herein. In certain examples, aspects of the operations of 1610 may be performed by a time resource identifier as described with reference to FIGS. 10 through 13.

At 1615 the base station 105 may identify a search space for the UE 115 to receive a PDCCH message based on the first RACH message, where the identified search space includes time resources that are different from the identified set of time resources. The operations of 1615 may be performed according to the methods described herein. In certain examples, aspects of the operations of 1615 may be performed by a search space identifier as described with reference to FIGS. 10 through 13.

At 1620 the base station 105 may map the PDCCH message to CCEs within the identified search space. The operations of 1620 may be performed according to the methods described herein. In certain examples, aspects of the operations of 1620 may be performed by a mapping component as described with reference to FIGS. 10 through 13.

At 1625 the base station 105 may transmit, to the UE 115, the PDCCH message according to the mapping. The operations of 1625 may be performed according to the methods described herein. In certain examples, aspects of the operations of 1625 may be performed by a transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a synchronization signal block (SSB) via a receive beam of the UE;
transmit a random access (RACH) message based at least in part on the SSB received via the receive beam of the UE; and
monitor one or more monitoring occasions of a Type0 physical downlink control channel (Type0-PDCCH) common search space over two consecutive slots for a physical downlink control channel (PDCCH) message in a search space, the Type0-PDCCH common search space corresponding to the SSB and configured via a physical broadcast channel (PBCH) configuration, wherein a start of the search space is based at least in part on the RACH message and an end of the search space is based at least in part on a response timer.

2. The UE of claim 1, wherein the PDCCH message comprises a PDCCH grant for a RACH message 2 (Msg2) transmission, a PDCCH grant for a RACH message 3 (Msg3) transmission, a PDCCH grant for a RACH message 4 (Msg4) transmission, or a combination thereof.

3. The UE of claim 1, wherein the one or more processors are individually or collectively operable to execute the code to further cause the UE to:
receive one or more other SSBs via one or more second receive beams that are different from the receive beam.

4. The UE of claim 1, wherein
the PBCH configuration indicates a remaining minimum system information (RMSI) search space corresponding to the SSB.

5. The UE of claim 4, wherein
one or more time resources are removed from the RMSI search space that overlap with a set of time resources associated with one or more other SSBs, wherein the search space comprises remaining time resources of the RMSI search space based on the one or more time resources being removed.

6. The UE of claim 5, wherein
the search space comprises same symbol index locations as the RMSI search space but with an altered slot-level periodicity different from a slot-level periodicity of the RMSI search space.

7. The UE of claim 4, wherein the one or more processors are individually or collectively operable to execute the code to further cause the UE to:
receive an RMSI transmission associated with a default search space, wherein
monitoring for the PDCCH message is further based at least in part on one or more second monitoring occasions of the RMSI search space.

8. The UE of claim 1, wherein
the search space comprises a remaining minimum system information (RMSI) search space with time resources non-overlapping with a set of time resources associated with one or more other SSBs.

9. The UE of claim 1, wherein the one or more processors are individually or collectively operable to execute the code to further cause the UE to:
receive an indication of a first set of time resources for the search space, wherein one or more time resources of a second set of time resources associated with one or more other SSBs are removed from the first set of time resources for the search space, wherein the search space comprises remaining time resources of the first set of time resources for the search space based on the one or more time resources of the second set of time resources being removed.

10. The UE of claim 9, wherein:
the indication of the first set of time resources for the search space comprises a time window for the search space; and
a subset of slots of the time window comprise the search space.

11. The UE of claim 10, wherein the subset of slots comprises each slot of the time window.

12. The UE of claim 1, wherein the response timer comprises a random access response (RAR) window, a contention resolution timer, or a combination thereof.

13. The UE of claim 1,
wherein the RACH message is transmitted in a RACH occasion corresponding to the SSB.

14. The UE of claim 1,
wherein the search space is monitored using the receive beam during time resources that are different from a set of time resources associated with one or more other SSBs, and wherein
at least one SSB of the one or more other SSBs is received via a second receive beam different from the receive beam during the set of time resources.

15. The UE of claim 14, wherein the one or more processors are individually or collectively operable to execute the code to further cause the UE to:
receive the at least one SSB of the one or more other SSBs based at least in part on the time resources for the search space not overlapping with the set of time resources associated with the one or more other SSBs.

16. The UE of claim 1, wherein the one or more processors are individually or collectively operable to execute the code to further cause the UE to:
receive the PDCCH message in one or more control channel elements (CCEs) of the search space based at least in part on the monitoring.

17. The UE of claim 1, wherein one or more other SSBs associated with a set of time resources comprise one or more SSBs actually transmitted by a network entity.

18. The UE of claim 17, wherein the one or more processors are individually or collectively operable to execute the code to further cause the UE to:
receive an indication of the one or more SSBs actually transmitted by the network entity via remaining minimum system information (RMSI), other system information (OSI), a radio resource control (RRC) message, a medium access control (MAC) control element (CE), a handover message, or a combination thereof.

19. A method for wireless communications at a user equipment (UE), comprising:
receiving a synchronization signal block (SSB) via a receive beam of the UE;
transmitting a random access (RACH) message based at least in part on the SSB received via the receive beam of the UE; and
monitoring one or more monitoring occasions of a Type0 physical downlink control channel (Type0-PDCCH) common search space over two consecutive slots for a physical downlink control channel (PDCCH) message in a search space, the Type0-PDCCH common search space corresponding to the SSB and configured via a physical broadcast channel (PBCH) configuration, wherein a start of the search space is based at least in part on the RACH message and an end of the search space is based at least in part on a response timer.

20. An apparatus for wireless communications at a network entity, comprising:
one or more memories; and
one or more processors coupled to the one or more memories and configured to:
transmit a synchronization signal block (SSB) associated with a receive beam of a user equipment (UE);
receive a random access (RACH) message based at least in part on the SSB associated with the receive beam of the UE; and
transmit, based on one or more monitoring occasions of a Type0 physical downlink control channel (Type0-PDCCH) common search space over two consecutive slots, a physical downlink control channel (PDCCH) message associated with a search space, the Type0-PDCCH common search space corresponding to the SSB and configured via a physical broadcast channel (PBCH) configuration, wherein a start of the search space is based at least in part on the RACH message and an end of the search space is based at least in part on a response timer.

* * * * *